US012542400B2

(12) United States Patent
Hellige et al.

(10) Patent No.: US 12,542,400 B2
(45) Date of Patent: Feb. 3, 2026

(54) CONNECTOR ASSEMBLY

(71) Applicant: HARTING Electric Stiftung & Co. KG, Espelkamp (DE)

(72) Inventors: Denny Hellige, Bad Oeyenhausen (DE); Ensign Wen, Zhuhai (CN); Frank Böhmann, Lastrup (DE)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 377 days.

(21) Appl. No.: 18/035,843

(22) PCT Filed: Nov. 4, 2021

(86) PCT No.: PCT/DE2021/100879
§ 371 (c)(1),
(2) Date: May 8, 2023

(87) PCT Pub. No.: WO2022/096065
PCT Pub. Date: May 12, 2022

(65) Prior Publication Data

US 2023/0402790 A1 Dec. 14, 2023

(30) Foreign Application Priority Data

Nov. 9, 2020 (CN) ........................ 202011239802.X
Mar. 16, 2021 (CN) ........................ 202110282328.7

(51) Int. Cl.
*H01R 13/639* (2006.01)
*H01R 13/52* (2006.01)
(Continued)

(52) U.S. Cl.
CPC ....... *H01R 13/639* (2013.01); *H01R 13/5202* (2013.01); *H01R 13/5219* (2013.01);
(Continued)

(58) Field of Classification Search
None
See application file for complete search history.

(56) References Cited

U.S. PATENT DOCUMENTS 4,952,175 A * 8/1990 Waters ............... H01R 13/6453 439/906
5,266,047 A * 11/1993 Black .................. H01R 13/631 439/364
(Continued)

FOREIGN PATENT DOCUMENTS

CN 208674463 U 3/2019
CN 211265803 U 8/2020
(Continued)

*Primary Examiner* — Ross N Gushi
(74) *Attorney, Agent, or Firm* — Smartpat PLC

(57) ABSTRACT

A connector assembly comprises: a first connector, which has a housing forming an installation space and has a contact terminal accommodated in the installation space; a second connector, which has a housing forming an installation space and has a contact terminal accommodated in the installation space; and a locking device, by means of which the first and second connectors are locked while they are joined together. The locking device comprises a release protection component on either the first connector or the second connector and an insert on the other of the components first connector and second connector. The disclosure further relates to an adapter, a connector, a lateral locking device and a mounting frame for the connector assembly. The connector assembly is easy to assemble, allows the entire device to be made compact, and has improved electromagnetic shielding and watertightness.

31 Claims, 21 Drawing Sheets

(51) Int. Cl.

| | |
|---|---|
| ***H01R 13/621*** | (2006.01) |
| ***H01R 13/629*** | (2006.01) |
| ***H01R 13/645*** | (2006.01) |
| ***H01R 13/6581*** | (2011.01) |
| ***H01R 24/00*** | (2011.01) |
| ***H01R 31/06*** | (2006.01) |

(52) U.S. Cl.

CPC ..... *H01R 13/621* (2013.01); *H01R 13/62933* (2013.01); *H01R 13/6456* (2013.01); *H01R 13/6581* (2013.01); *H01R 24/00* (2013.01); *H01R 31/06* (2013.01)

(56) References Cited

U.S. PATENT DOCUMENTS

| | | | | |
|---|---|---|---|---|
| 10,784,624 | B2 * | 9/2020 | Quast .................. | H01R 13/633 |
| 2005/0070145 | A1 | 3/2005 | Huang | |

FOREIGN PATENT DOCUMENTS

| | | | |
|---|---|---|---|
| DE | 29711173 | U1 | 8/1997 |
| JP | S538595 | U | 1/1978 |
| JP | 10672178 | U | 10/1994 |
| KR | 20200005817 | A | 1/2020 |

* cited by examiner

CONNECTOR ASSEMBLY

CROSS-REFERENCE TO RELATED APPLICATION

This application is a national stage application, filed under 35 U.S.C. § 371, of International Patent Application No. PCT/DE2021/100879, filed on 4 Nov. 2021, which claims the benefit of Chinese Patent Application No. 202011239802.X, filed 9 Nov. 2020 and Chinese Patent Application No. 202110282328.7, filed 13 Mar. 2021.

TECHNICAL FIELD

The disclosure relates to a connector assembly for a highly resilient connector. The disclosure also relates to a connector for the connector assembly, an adapter for the connector assembly, a lateral locking device for the connector assembly and a mounting frame for the connector assembly.

BACKGROUND

A connector, in particularly a highly resilient connector is generally used to supply electrical energy in the field of rail transport and can safely transmit the electrical energy in various circumstances.

The disadvantages of the connectors in the prior art lie, however, in a large volume and a large quantity of components which leads to complex mounting. The connectors in the prior art are furthermore not flexibly suitable for various mounting applications. If appliances for the supply of various electrical powers are supposed to be used, connectors with different sizes must also be used for these applications. This increases the production costs and prevents the modular production of the connectors. In the case of such a connector, good resistance capacity to electromagnetic interference (EMI) and high electromagnetic compatibility (EMC) are necessary which, however, are impaired by aging of the sealing device in the connector in the prior art.

SUMMARY

An object of the present disclosure lies in providing a connector assembly with a compact structure and flexible suitability for various applications.

In a first aspect, a connector assembly is provided, comprising—a first connector which has a housing that forms an installation space and a contact terminal accommodated in the installation space—a second connector which has a housing that forms an installation space and a contact terminal accommodated in the installation space, and a locking device via which in the case of a first and second connector joined together the first and second connectors are locked, wherein the locking device has a release protection component located on either the first connector or the second connector and an insert located on the other of the components of the first connector and second connector, wherein in the case of a first and second connector combined with one another the release protection component and the insert engage in one another, while in the case of a first and second connector separated from one another the release protection component is separated from the insert and remains connected to the first connector or the second connector on which the release protection component is located.

In one advantageous embodiment, the connector assembly further comprises one or more adapters, wherein the adapter likewise has a housing that forms an installation space and a contact terminal accommodated in the installation space, wherein in the case of an adapter arranged between the first connector and the second connector, the installation space of the first connector, the installation space of the second connector and the installation space of the adapter are connected to one another, and wherein the contact terminals in the first connector, the second connector and the adapter can be connected to one another in order to transmit electrical energy.

In one advantageous embodiment, the release protection component is a release protection bolt and the insert is a threaded insert, hence engaging in one another via a thread is possible both between the release protection bolt and the threaded insert and between the release protection bolt and the first connector or the second connector on which the release protection bolt is located.

In one advantageous embodiment, the release protection bolt has at the points facing its two ends in each case a thread, wherein, in the case of combination with the first connector and the second connector, the thread of a point facing the distal end of the release protection bolt serves the purpose of combination with the threaded insert, while, in the case of separation from the first connector and the second connector, the thread of a point facing the proximal end of the release protection bolt serves to combine with the thread in the housing of the first connector or the second connector on which the release protection bolt is located, wherein the outer diameter of the thread of the point facing the distal end of the release protection bolt is equal to or smaller than the outer diameter of the thread of the point facing the proximal end of the release protection bolt and the diameter of the bolt portion, located between these two threads, of the release protection bolt is smaller than the outer diameter of the two threads.

In one advantageous embodiment, the connector assembly has two such release protection components which are arranged along the diagonal direction of the housing of the first connector or the second connector.

In one advantageous embodiment, the connector assembly furthermore comprises a foolproof device which serves to prevent an incorrect joining together of the first and second connector.

The foolproof device is furthermore a coding pin which comprises a coding pin half located on the first connector and a coding pin half located on the second connector, wherein the coding pin half arranged on the first connector and the coding pin half arranged on the second connector can be arranged opposite one another in the longitudinal direction of the coding pin if the first connector and the second connector matched thereto are combined with one another.

According to one advantageous embodiment, the connector assembly furthermore comprises a guide device which serves during mounting of the first and second connector to guide the fitting of the first and second connector to one another, which guide device comprises a first guide element located on the first connector and a second guide element located on the second connector, wherein the connector assembly has two guide devices which are arranged along the diagonal direction of the housing of the first connector or the second connector and opposite the release protection component arranged on the first connector or the second connector.

In one advantageous embodiment, a sealing apparatus which serves to seal off the fitting surfaces between these parts is provided between the first and second connector and, if an adapter is present, between the first connector, the second connector and the adapter, wherein the sealing apparatus comprises a sealing groove, which is located on one of the two fitting surfaces which should be connected to one another, and a sealing ring inserted in the sealing groove, wherein the circumference of the sealing groove is larger than the circumference of the sealing ring in order to clamp the sealing ring in the case of a sealing ring inserted in the sealing groove.

In one advantageous embodiment, the sealing groove has a polygonal outline and in the longitudinal direction of the fitting surface of a component provided with the sealing groove the polygonal outline has at least one indentation which projects outward.

In one advantageous embodiment, the circumference of the sealing ring is 15% to 30% smaller than the circumference of the sealing groove.

The sealing ring furthermore has an expansion and contraction rate of 15% to 30%.

As a result of the provision of the locking device and the sealing apparatus according to the technical solutions described above of the connector assembly, the electromagnetic shielding of the joined together connector can be improved. As a result of the provision of the adapter between the first and second connector, these connectors can be flexibly suitable for connector assemblies which satisfy different demands in terms of electrical power. Since a foolproof device is provided, incorrect fitting during combination of the connectors can be prevented. A guide pin is furthermore provided so that mounting becomes easier, cheaper, time- and labor-saving and simultaneously the accuracy of the joining together and the fitting is ensured. Moreover, as a result of the provision of a groove half with a polygonal outline, the sealing ring arranged therein can be clamped so that during joining together a crushing of the component to be connected due to the relaxation of the sealing ring in the longitudinal direction can be prevented. An integrally bonded engagement between the connecting components can furthermore be prevented with the locking device in order to facilitate the actuation.

In a second aspect, an adapter for the connector assembly described above is provided, wherein the first and second connector are identical, and the adapter has a housing that forms an installation space and a contact terminal accommodated in the installation space.

In one advantageous embodiment, the adapter furthermore comprises a first hole which enables the release protection component of the locking device to be guided through and a second hole which enables the guide device which serves to guide the fitting of the first and second connector to one another to be guided through.

In one advantageous embodiment, the adapter comprises two first holes and two second holes, wherein the two first holes and the two second holes are arranged in each case diagonally at four corners of the housing of the adapter.

In one advantageous embodiment, the adapter furthermore comprises a third hole to accommodate a locking element, wherein the locking element serves to lock the first connector and the adapter.

In one advantageous embodiment, the adapter furthermore comprises a sealing groove to accommodate a sealing ring, wherein the sealing groove has a polygonal outline and in the longitudinal direction of the fitting surface of the adapter, provided with the sealing groove, the polygonal outline has at least one indentation which projects outward.

In one advantageous embodiment, the circumference of the sealing ring is 15% to 30% smaller than the circumference of the sealing groove.

In one advantageous embodiment, the sealing ring has an expansion and contraction rate of 15% to 30%.

In a third aspect, a connector for the connector assembly described above is provided, wherein a housing of the connector has a cable input via which the cable is linked by a cable gland to the housing, and wherein two side walls are formed in each case in an undulating manner in the longitudinal direction of the housing of the connector.

In one advantageous embodiment, the cable gland is a cable gland of the type M50.

In one advantageous embodiment, the cable input comprises an upper cable input and a lateral cable input.

In one advantageous embodiment, the connector is embodied as an angled connector, wherein the cable input comprises an upper cable input, a lateral cable input and an angled cable input.

In one advantageous embodiment, the angled cable input has an angle of 30° or 45° to a plane in the longitudinal direction of the housing. Naturally, the angled cable input can have any desired acute angle.

In a fourth aspect, a lateral locking device for the connector assembly described above is provided, wherein in the case of a first and second connector joined together these are locked via the lateral locking device, and wherein the lateral locking device fits with a locking holder on a side wall of the first connector and with a mating terminal on a side wall of the second connector in order to lock the first and second connector.

In one advantageous embodiment, the lateral locking device comprises a first lever, which is mounted pivotably on the mating terminal of the second connector, and a second lever, which is mounted pivotably on the first lever and serves the purpose of fixed locking on the locking holder of the first connector.

In one advantageous embodiment, the second lever is elastic.

In one advantageous embodiment, the first lever has a handle.

In one advantageous embodiment, the first lever comprises two first lever arms parallel to one another, wherein each of the first lever arms comprises at both ends a first pivot shaft hole, which enables a first pivot shaft to be guided through, or a second pivot shaft hole, which enables a second pivot shaft to be guided through, as well as a connecting portion which connects the two first lever arms to one another at the end at which the second pivot shaft hole is located; wherein the handle is molded integrally on the connecting portion; wherein the second lever comprises two second lever arms parallel to one another, wherein each of the second lever arms comprises at both ends in each case a third pivot shaft hole, which enables the second pivot shaft to be guided through, and a fourth pivot shaft hole, which enables a third pivot shaft to be guided through; and wherein the second lever is arc-shaped.

In one advantageous embodiment, the mating terminal of the second connector has a through-hole, wherein the first pivot shaft penetrates through the through-hole and the first pivot shaft hole and is fastened by means of an E-shaped locking means to the mating terminal; wherein the clamping sleeve holder comprises a locking plate and a mating locking plate, between which an opening for admitting and discharging the third pivot shaft of the second connector is formed, and wherein the opening is oblique.

In one advantageous embodiment, it is provided in the case in which the connector assembly also comprises an adapter and the first connector, the second connector and the adapter are joined together, the second connector and the adapter are locked by the lateral locking device, wherein the adapter has a clamping sleeve holder. The structure of the locking holder is identical to the structure of the locking holder of the first connector.

In a fifth aspect, a mounting frame for the connector assembly described above is provided which fastens the connector assembly to an appliance, wherein the mounting frame has an opening to accommodate the second connector and a sealing means to provide a seal between the second connector and the mounting frame.

BRIEF DESCRIPTION OF THE DRAWINGS

The further advantages and details of the invention will become clearer as a result of the detailed description in conjunction with the following figures. In the figures.

DETAILED DESCRIPTION

The technical solutions of the present invention are hereby described in greater detail by exemplary embodiments in conjunction with the figures. In the description, identical or similar reference numbers represent identical or similar parts. The following description in relation to the figures only serves to explain the general concept of the present invention and should not be interpreted as a restriction of the invention.

It should be clear to the person skilled in the art that the "longitudinal direction" stated herein relates to the direction in which the extension is significantly greater than the extensions in other directions and that the "transverse direction" relates to the direction in which the extension is significantly smaller than the extension in the longitudinal direction.

Figure 1:
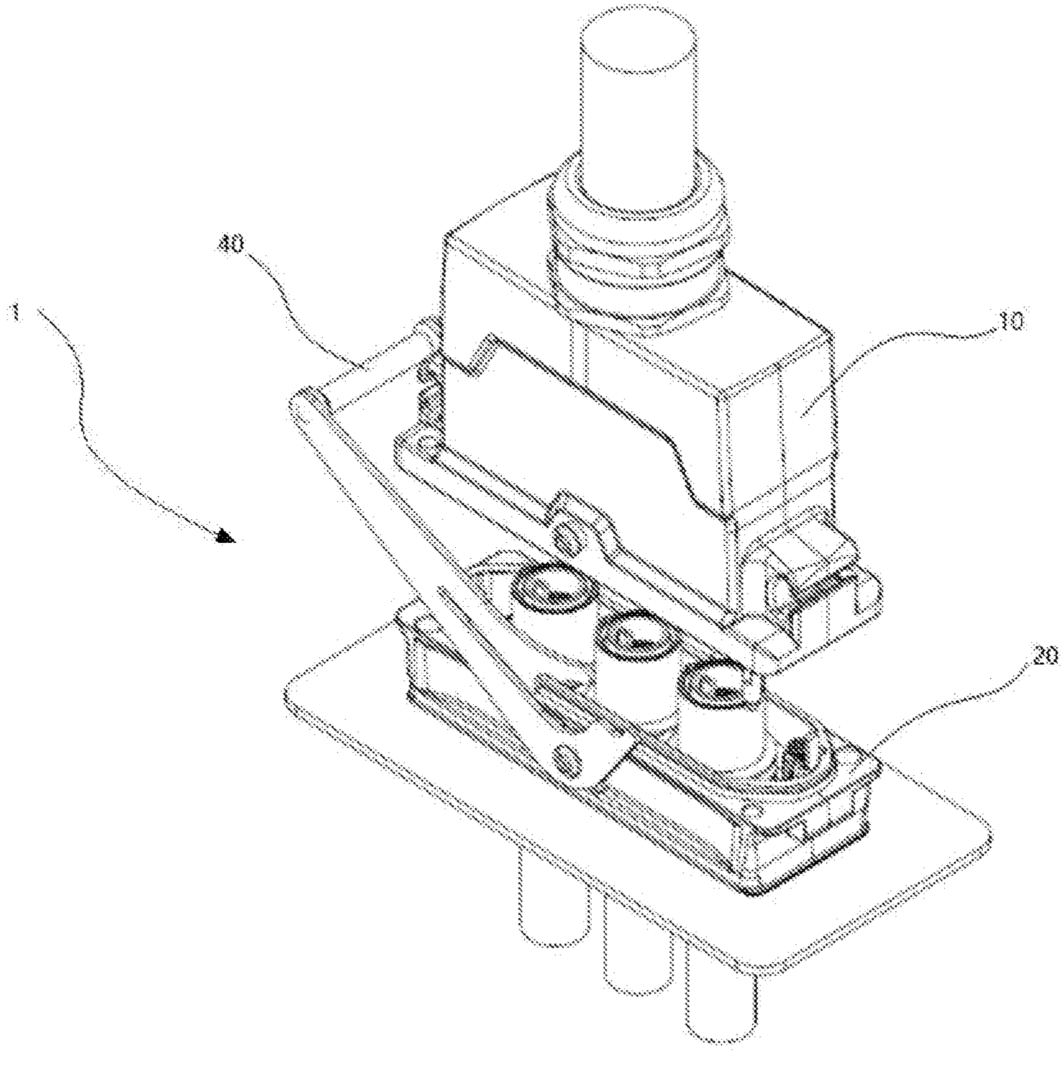
FIG. 1 is a perspective exploded view of a connector assembly which has still to be joined together in one embodiment in the case of which no adapter is arranged between the first and second connector.

FIG. 1 shows a perspective exploded view of a connector assembly 1 still to be joined together in one embodiment in the case of which no adapter is arranged between the first connector 10 and the second connector 20.

As shown in FIG. 1, the connector assembly 1 in the embodiment comprises a first connector 10, a second connector 20 and a locking device 40 (i.e. a form of the locking device), via which, in the case of first connector 10 and second connector 20 being joined together, the first connector 10 and the second connector 20 are locked.

In FIG. 1, the first connector 10 is embodied as a plug of the connector assembly 1 and the second connector 20 is embodied as a bushing of the connector assembly 1, and the second connector 20 is located on a panel of an appliance to be supplied with electrical energy. The first connector 10 and the second connector 20 can engage in one another by means of the contact terminals respectively accommodated therein in order to transmit electrical energy.

In the embodiment represented in FIG. 1, the locking device 40 is embodied as a central locking device (also referred to as a central buckle) which achieves the locking substantially at the center of the connector assembly 1. However, the invention is not restricted thereto and other forms of the locking device are explained one after the other below, such as, for example, in the forms of the lateral buckle shown in FIG. 14 and of the release protection bolt.

Figure 2:
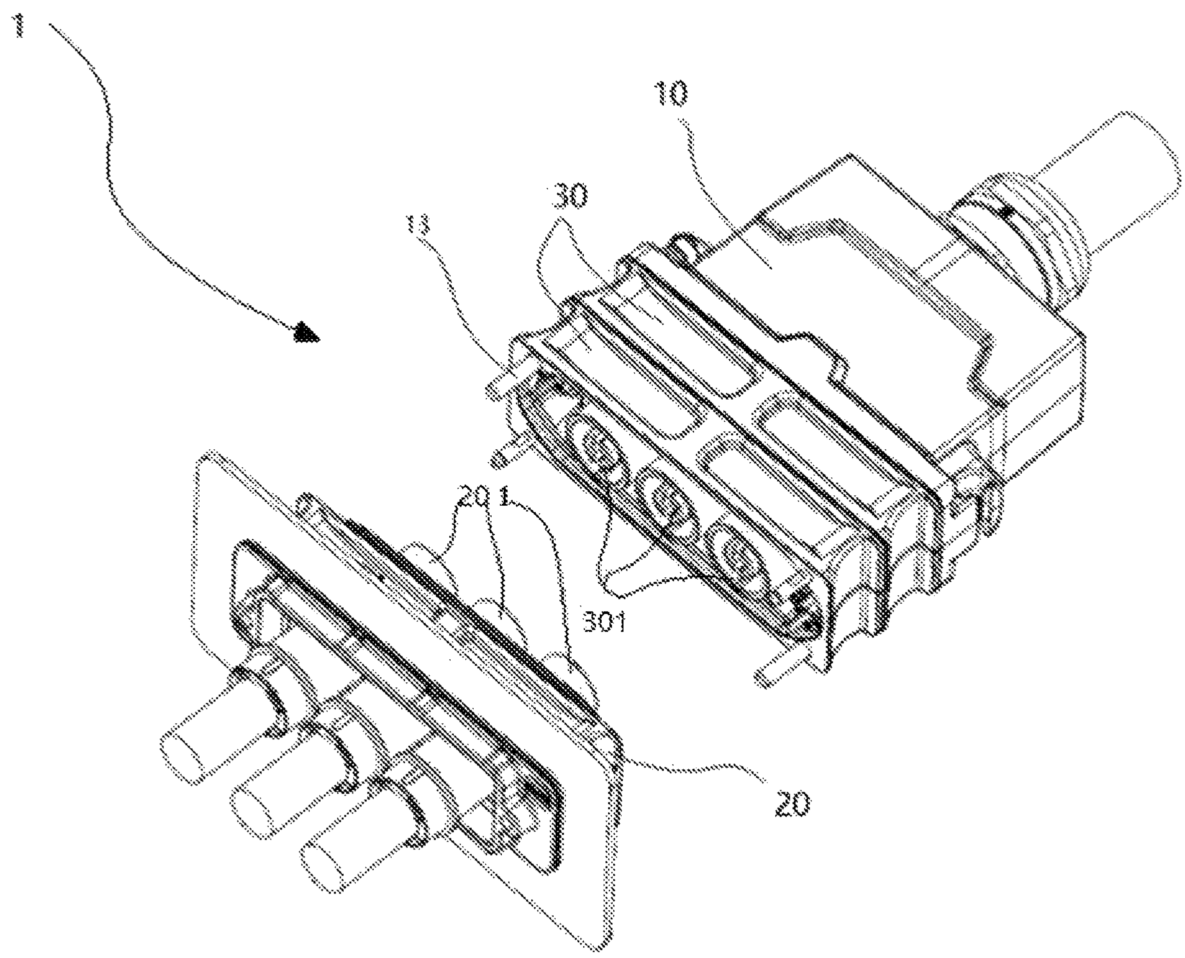
FIG. 2 is a perspective exploded view of a connector assembly which has still to be joined in another embodiment in the case of which an adapter is arranged between the first and second connector.

FIG. 2 shows a perspective exploded view of a connector assembly 1 which has still to be joined together in another embodiment, in the case of which two adapters are arranged between the first connector 10 and the second connector 20.

As shown in FIG. 2, the connector assembly 1 in the embodiment comprises a first connector 10, a second connector 20, two adapters 30 and a locking device via which the first connector 10, the two adapters 30 and the second connector 20 are fastened together.

In this embodiment, the locking device is embodied as release protection bolt 13. The release protection bolt 13 protrudes from the first connector 10 through the two adapters 30 in order to lock the first connector 10 as well as the two adapters 30 with the second connector 20. The concrete structure of the locking device with the release protection bolt 13 is described in further detail further below.

Two adapters 30 between the first connector 10 and the second connector 20 are represented in FIG. 2. The adapters 30 were linked to the first connector 10. The assembly composed of the first connector 10 and the two adapters 30 is then linked to the second connector 20. Although this is not shown in FIG. 2, it should be clear to the person skilled in the art that one or more adapters 30 can be arranged between the first connector and the second connector 20.

FIG. 2 represents three contact terminals 201 on the second connector 20 and three contact terminals 301 at the bottom on an adapter 30 which engages into the second connector 20. It should be clear to the person skilled in the art that the contact terminals accommodated in the installation spaces of the first connector 10, the second connector and these adapters 30 can be connected to one another to transmit electrical energy.

The concrete structure of the individual components of the connector assembly 1 will be described in greater detail below according to FIG. 3 to FIG. 16.

Figure 3:
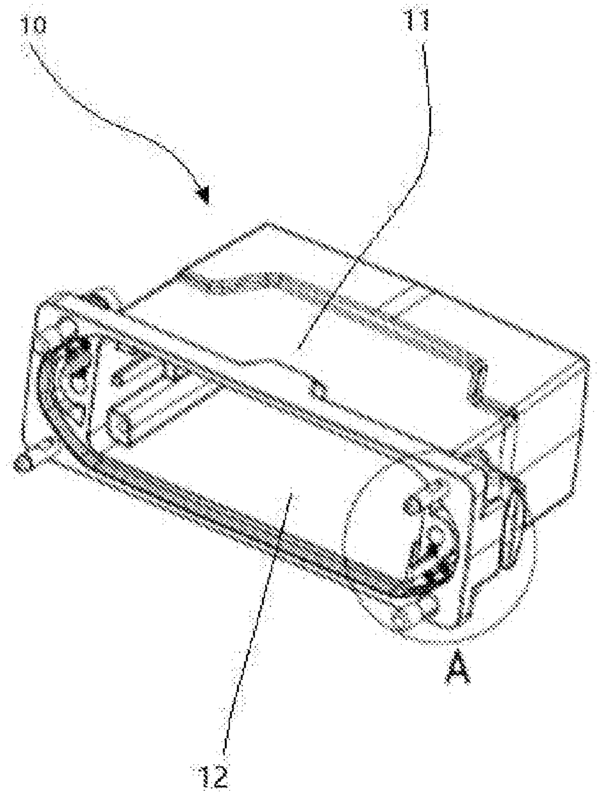
FIG. 3 is a perspective view of a first connector of the connector assembly in one embodiment in which no inner contact terminal is represented.
Figure 4:
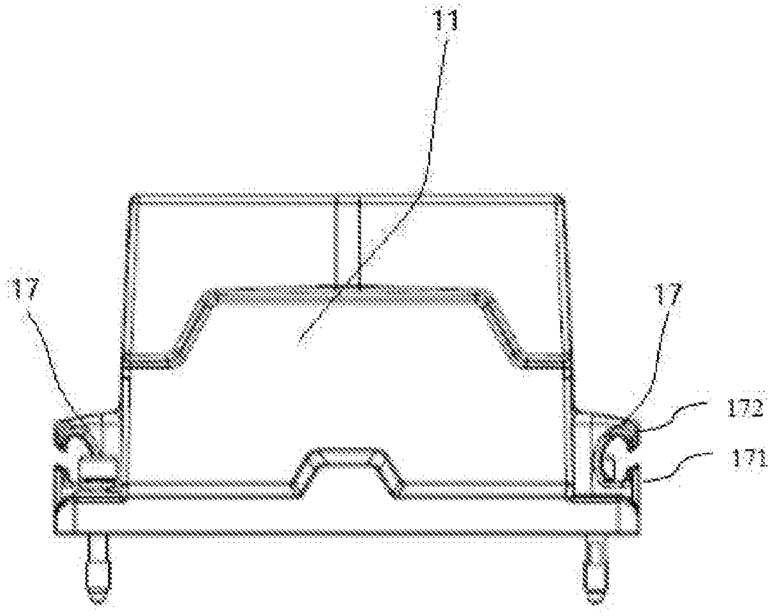
FIG. 4 is a representation of the first connector shown in FIG. 3.
Figure 5:
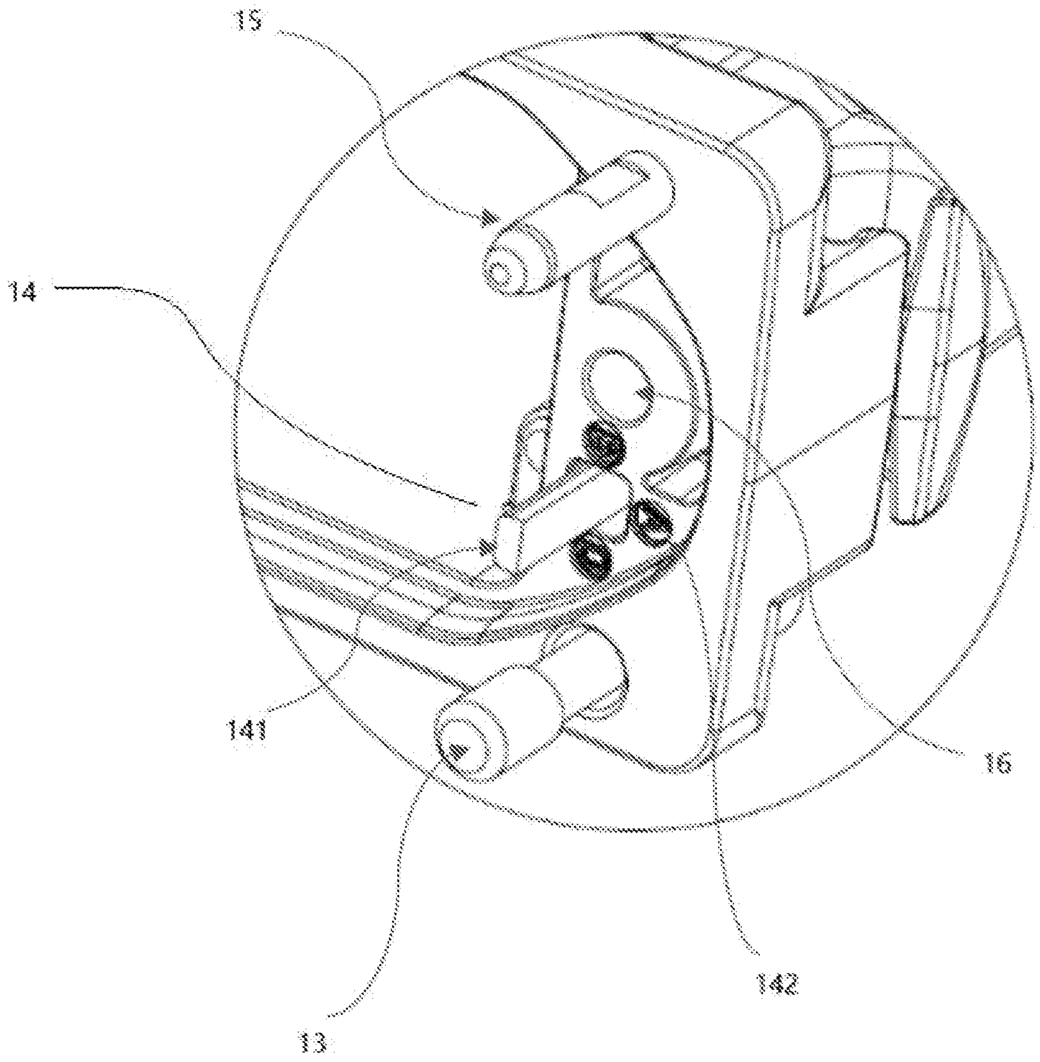
FIG. 5 is an enlarged view of the portion A of the first connector shown in FIG. 3.

FIG. 3 shows a perspective view of a first connector 10 of the connector assembly 1 in one embodiment in which no inner contact terminal is represented; FIG. 4 shows a representation of the first connector 10 shown in FIG. 3; and FIG. 5 shows an enlarged view of the portion A of the first connector 10 shown in FIG. 3.

As shown in FIG. 3, the first connector 10 is formed to be substantially rectangular and has a housing 11. An installation space 12 is formed in the housing 11. The contact terminals shown in FIG. 1 and FIG. 2 are mounted in the installation space 12 for the transmission of electrical energy.

It should be clear to the person skilled in the art that the shape of the first connector 10 should not be restricted to a rectangle and can have any desired further shape which is known in the field such as an oval, elliptical or even square shape.

FIG. 4 also represents a housing 11, and a component of a lateral locking device which serves as a further example of the locking device, i.e. a clamping sleeve holder 17, is shown. An elastic clamping sleeve (also referred to as an elastic terminal), not represented in FIG. 4 and actually located in the second connector 20, is positioned in the clamping sleeve holder 17 during locking of the first connector 10 and of the second connector 20.

In the enlarged view shown in FIG. 5 of the portion A from FIG. 3, the housing 11 of the first connector 10 is also provided with a locking device embodied as a release protection bolt (release protection component) 13, a foolproof device 14, a guide pin 15 and a threaded hole 16.

The release protection bolt 13 is to be connected to a threaded insert in the second connector 20, which is described in greater detail further below.

The foolproof device 14 serves to prevent the connection of the first connector 10 to an incorrect (namely mismatching) second connector 20 if several connector assemblies 1 are present. In concrete terms, the foolproof device 14 in this embodiment is represented as a coding pin which comprises a coding pin half 141. This coding pin half 141 is located in one of several coding pin holes 142 which are represented in FIG. 5 as four coding pin holes and are in each case numbered. The coding pin half 141 serves, in cooperation with a corresponding coding pin half in the second connector 20, to prevent the plugging of the first connector 10 into an incorrect second connector 20.

The guide pin 15 is used to be plugged in a guide hole of the second connector 20 in order to guide the mounting of the first connector 10 on the second connector 20.

The bolt hole 16 is used to plug in a locking element (such as e.g. a threaded bolt) described further below in relation to FIG. 11 and FIG. 12 and located in a third hole 36 of the adapter 30 in order to lock the first connector 10 and the adapter 30.

Figure 6:
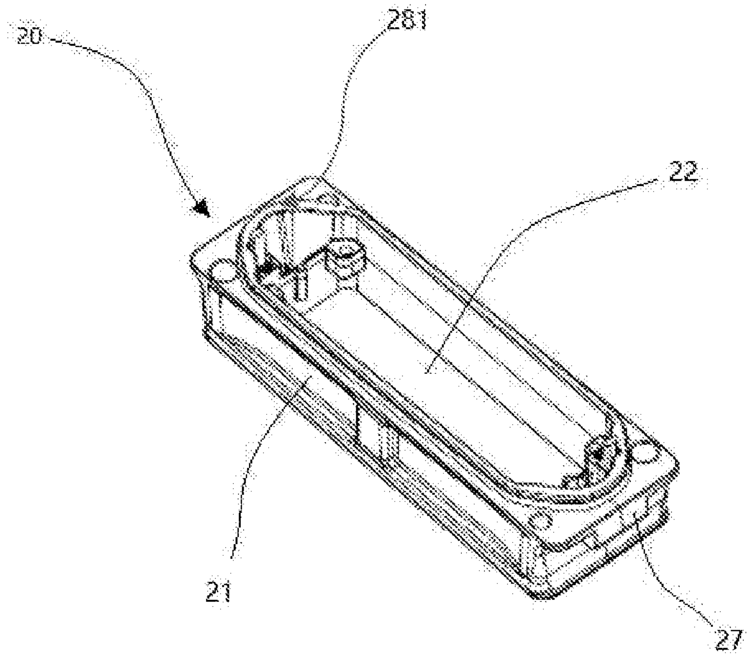
FIG. 6 is a perspective view of the upper side of the second connector of the connector assembly in one embodiment.
Figure 7:
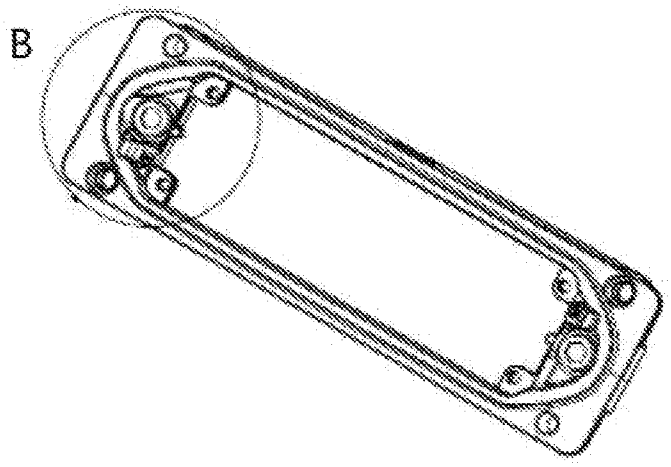
FIG. 7 is a representation of the underside of the second connector, shown in FIG. 6, of the connector assembly.
Figure 8:
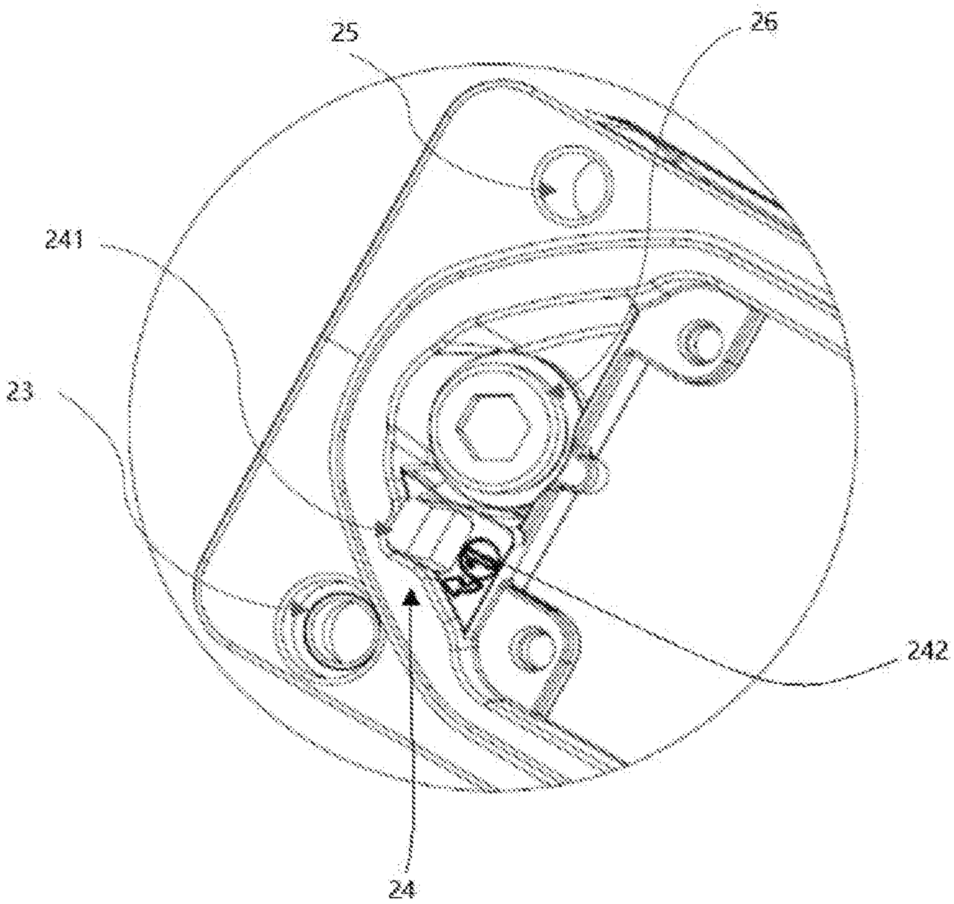
FIG. 8 is an enlarged view of the portion B of the second connector shown in FIG. 7.
Figure 9:
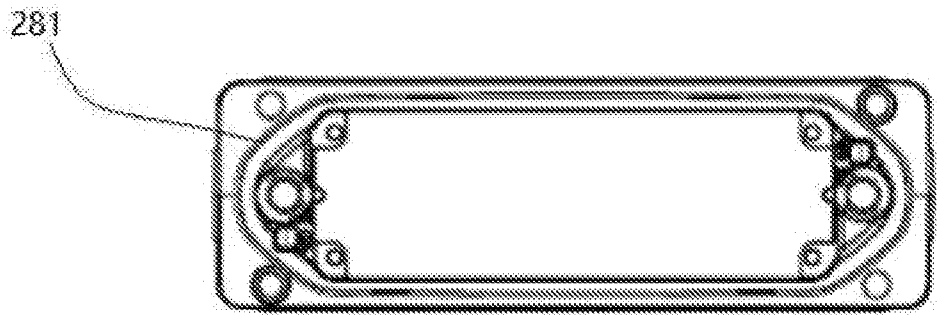
FIG. 9 is a plan view of the second connector shown in FIG. 6.

FIG. 6 shows a perspective view of an upper side of a second connector of the connector assembly 1 in one embodiment in which no inner contact terminal is represented; FIG. 7 shows a representation of the underside of the second connector shown in FIG. 6 of the connector assembly 1; FIG. 8 shows an enlarged view of the portion B of the second connector shown in FIG. 7; FIG. 9 shows a plan view of the second connector shown in FIG. 6; and FIG. 10 shows a schematic cross-sectional view from FIG. 9.

As shown in FIG. 6, the second connector 20 has a shape which is substantially similar to the shape of the first connector 10. The second connector 20 has a housing 21. An installation space 22 is formed in the housing 21. The contact terminals 201 shown in FIG. 1 for the transmission of electrical energy are mounted in the installation space 22, and the installation space 22 of the second connector 20 and the installation space 12 of the first connector 10 are connected to one another.

Figure 10:
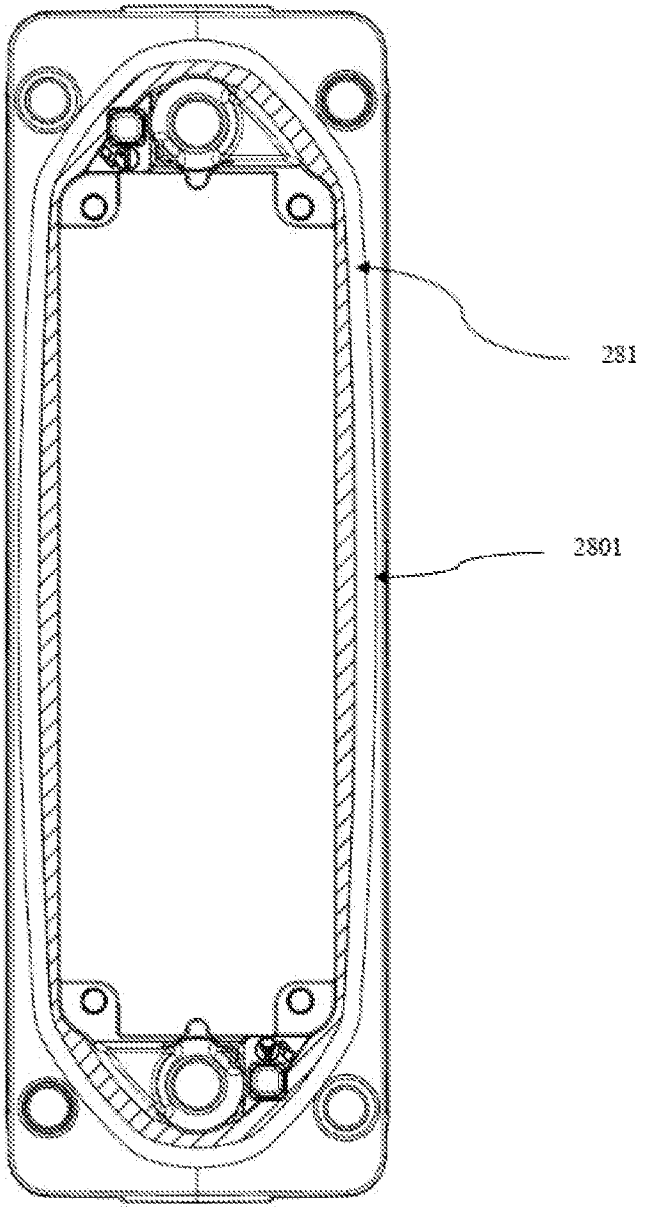
FIG. 10 is a schematic cross-sectional view from FIG. 9.
Figure 14:
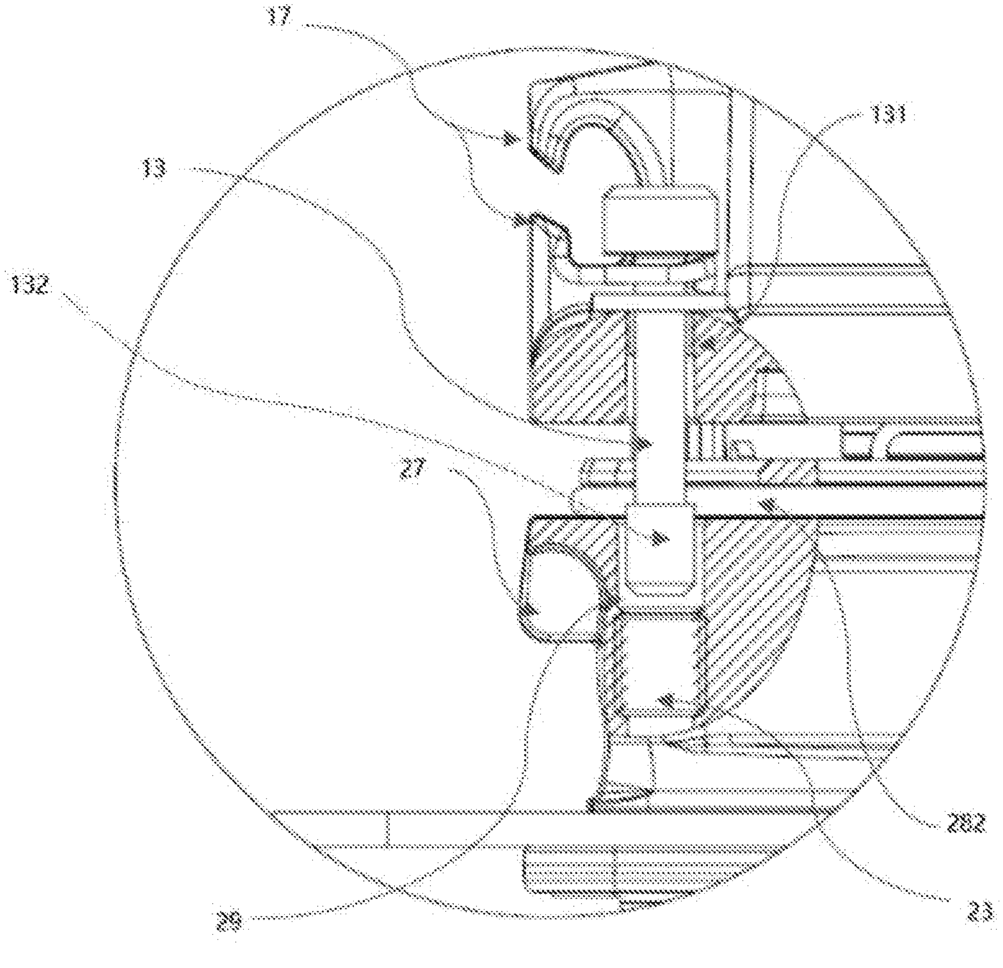
FIG. 14 is an enlarged view of the portion X shown in FIG. 13.

In FIGS. 6, 9 and 10, the second connector 20 is also represented with a sealing groove 281. The sealing groove 281 serves to insert a sealing ring 282 which is not shown in this case but is shown in FIG. 14. The sealing groove 281 and the sealing ring 282 jointly form a sealing apparatus which seals off the second connector 20 and the first connector 10 to be connected to this second connector 20 or the adapter 30 still to be described further below.

As represented in detail in FIG. 10, the sealing groove 281 has substantially the shape of an athletics track with a polygonal outline. In the longitudinal direction of the fitting surface, provided with the sealing groove 281, of the second connector 20 (i.e. on the longer edge 2801 of the track), the sealing groove 281 has at least one outwardly protruding indentation which can also be referred to as an apex or bulge.

I.e. at least the longer edge 2801 of the sealing groove is non-linear, i.e. e.g. arc-shaped. The circumference of the sealing groove 281 is slightly larger than the circumference of the sealing ring 282 placed in the sealing groove 281 so that the sealing groove 281 spans the sealing ring 282 if the sealing ring 282 is placed in the sealing groove 281. A relaxation of the sealing ring 282 can therefore be prevented after multiple removal and putting in place, which would otherwise lead to the lateral escape of the sealing ring from the sealing groove 281 (e.g. from the longer edge 2801 of the sealing groove) and thus to crushing of the sealing ring by a mating part. As a result of this, the IP properties and the life span of the sealing ring 282 can be improved and simultaneously the reliability of the entire device can be increased. In concrete terms, due to its material composition, the sealing ring has a specific expansion and contraction capacity. For example, the expansion and contraction rate of the sealing ring can reach 15%-30%. For the sealing apparatus formed as a side wall by the sealing groove 281 and the sealing ring 282, the circumference of the sealing ring 282 can be 15%-30% smaller than the circumference of the sealing groove 281. With the expansion and contraction capacity of the sealing ring, the sealing ring can bear better against the side wall of the sealing groove which has the shape of a track and is provided with a central, for example, arc-shaped indentation. As a result of this, the sealing ring is not deformed or crushed during release or during displacement. No fatigue deformation of the sealing ring furthermore arises even in the case of an excessive expansion and contraction rate or excessive compression.

In the prior art, the longer edge of the sealing groove in which the sealing ring is placed is formed to be substantially linear so that, after a certain operating time, the sealing ring easily escapes from the sealing groove and is crushed by the other corresponding component (the first connector or the adapter). However, in the case of the sealing apparatus according to the disclosure, as a result of the special structure mentioned above of the sealing groove, the sealing ring can be held at all times in the sealing groove, which can extend the life span of the sealing apparatus.

In the enlarged view shown in FIG. 8 of the part B from FIG. 7, the second connector is also provided with a hole with a threaded insert 23 placed therein, a foolproof device 24, a guide pin hole 25 and a locking bolt 26.

The threaded insert 23 serves to accommodate the release protection bolt 13 in the first connector 10. If the release protection bolt 13 engages through a thread into the threaded insert 23, the first connector 10 and the second connector 20 can be locked.

Figure 16:
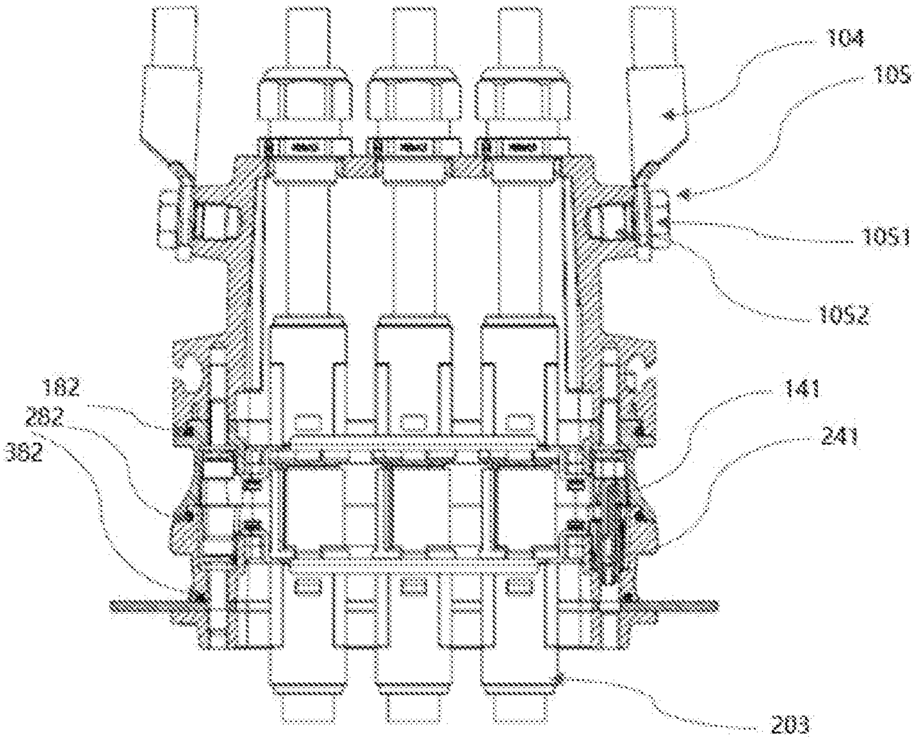
FIG. 16 is a longitudinal section of the use shown in FIG. 15.
Figure 17:
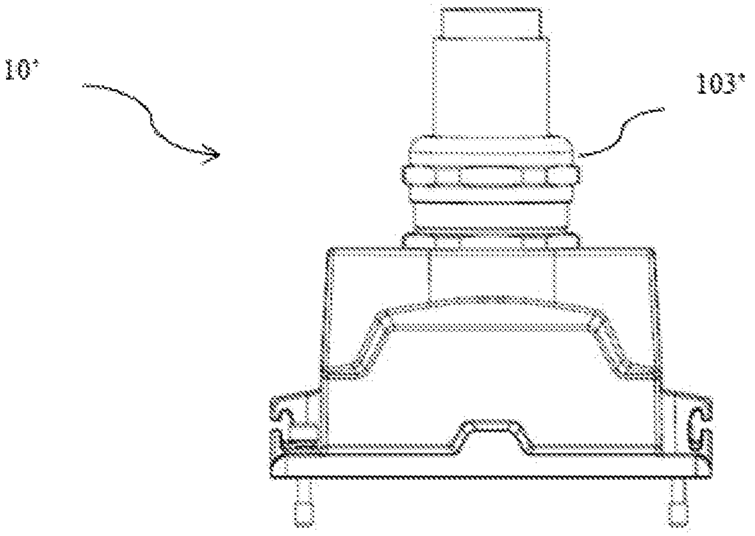
FIG. 17 is a representation of a connector of one embodiment.
Figure 18:
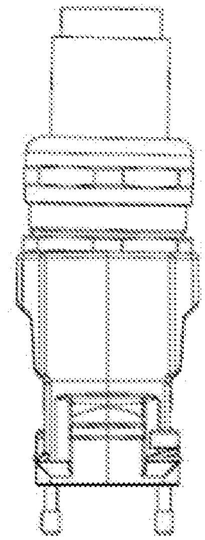
FIG. 18 is a side view of the connector shown in FIG. 17.
Figure 19:
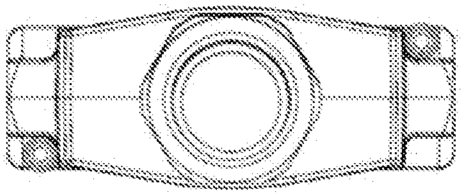
FIG. 19 is a plan view of the connector shown in FIG. 17.
Figure 20:
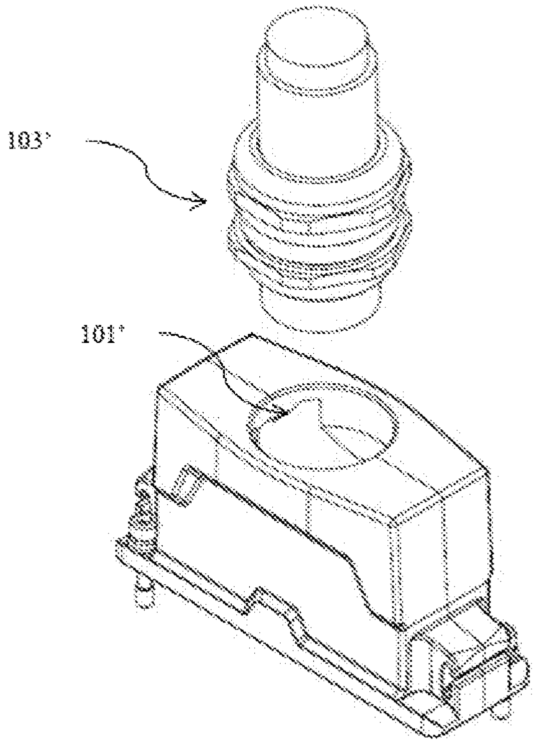
FIG. 20 is an exploded view of the connector shown in FIG. 17.
Figure 21:
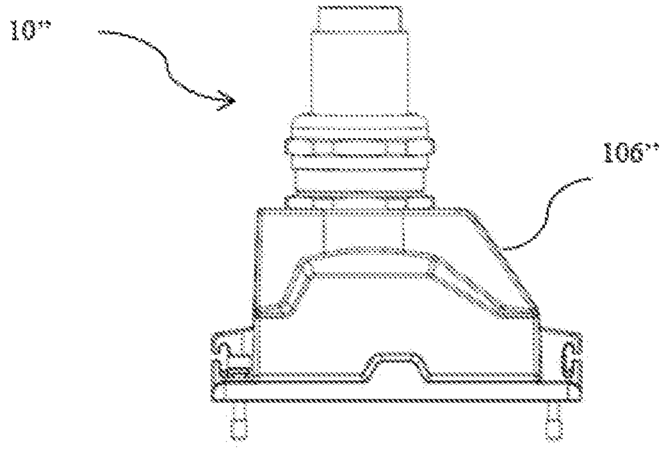
FIG. 21 is a representation of a connector of one embodiment.
Figure 22:
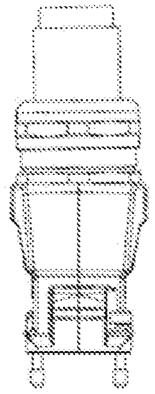
FIG. 22 is a side view of the connector shown in FIG. 21.
Figure 23:
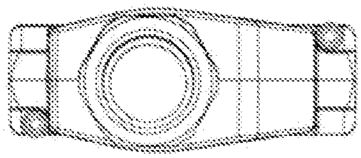
FIG. 23 is a plan view of the connector shown in FIG. 21.
Figure 24:
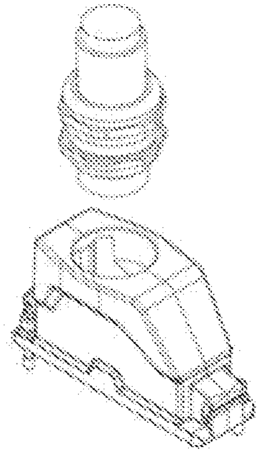
FIG. 24 is an exploded view of the connector shown in FIG. 21.

The foolproof device 24 in the second connector 20 interacts with the foolproof device 14 in the first connector 10. The foolproof device 24 comprises a coding pin half 241. This coding pin half 241 is located in a coding pin hole 242 (FIG. 8 represents a coding pin hole, but in actual fact several coding pin holes can be provided and numbered in each case). The coding pin half 241 serves, in cooperation with a corresponding coding pin half 141 in the first connector 10, to prevent plugging of the first connector 10 into an incorrect second connector 20. FIG. 16 likewise shows that the coding pin half 141 on the first connector 10 and the coding pin half 241 on the second connector 20 lie opposite one another, i.e. the two coding pin halves 141, 241 lie parallel to one another if the first connector 10 is combined with a correct second connector 20. The first connector 10 can thus be inserted into the second connector 20. In contrast, the coding pin half 141 on the first connector 10 and the coding pin half 241 on the second connector 20 impede one another if the first connector 10 is combined with an incorrect (non-corresponding) second connector 20. The insertion of the first connector 10 into the second connector 20 can thus be prevented. For example, the coding pin half 141 on the first connector 10 is located in a left-hand part in its own coding pin hole and the coding pin half 241 on the non-corresponding second connector 20 is likewise located in a left-hand part in its own coding pin hole so that the coding pin halves impede one another if such a first connector and such a non-corresponding second connector engage in one another.

The guide hole 25 is used to accommodate the guide pin 15 in the first connector 10 in order to guide the second connector 20 during mounting of the first connector 10.

The locking bolt 26 is used for plugging into a bolt hole of a panel of the appliance to be connected to the second connector 20 in order to connect the second connector 20 to the appliance.

Figure 11:
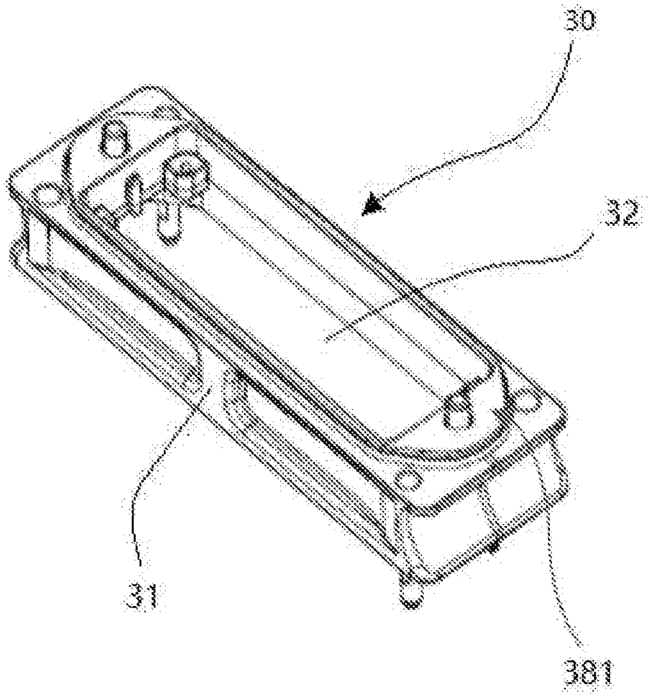
FIG. 11 is a perspective view of an adapter of the connector assembly in one embodiment in which no inner contact terminal is represented.
Figure 12:
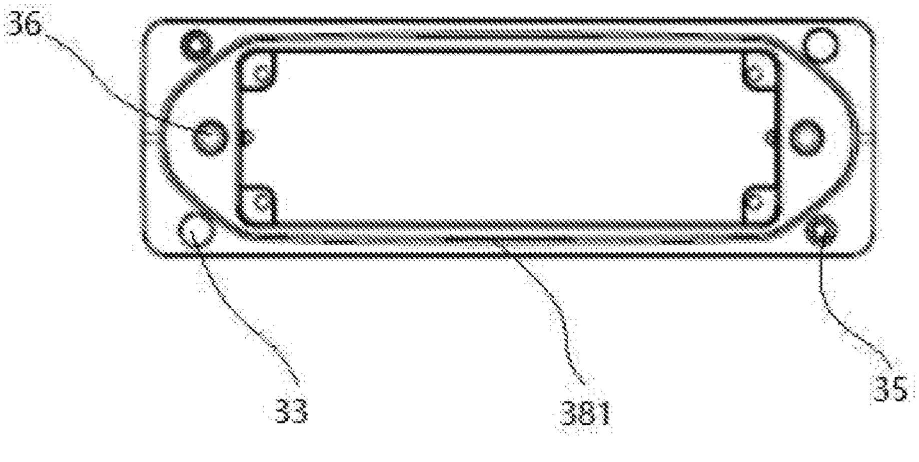
FIG. 12 is a plan view of the adapter shown in FIG. 11.

FIG. 11 shows a perspective view of an adapter of the connector assembly 1 in one embodiment in which no inner contact terminal is represented; and FIG. 12 shows a plan view of the adapter shown in FIG. 11.

The adapter 30 shown in FIG. 11 and FIG. 12 is used for arrangement between the first connector 10 and the second connector 20, and this adapter 30 has a housing 31. The housing 31 is formed with an installation space 32 to accommodate the inner contact terminals. The adapter 30 has a shape which is substantially similar to the shape of the first connector 10 and of the second connector 20. As shown at the top in FIG. 2, the contact terminals 301 are arranged in the installation space 32 of the adapter 30. The contact terminals 301 serve the purpose of connection to the contact terminals in the first connector 10 and the contact terminals in the second connector 20 in order to transmit electrical energy. The installation space 32 of the adapter 30 is thus connected to the installation space 12 of the first connector 10 and to the installation space 22 of the second connector 20.

As shown in FIG. 12, the adapter 30 further comprises first holes 33 which enable the release protection device (for example the release protection bolt 13) to be guided through. A total of two first holes 33 are provided which are arranged along the diagonal direction of the housing 31. The adapter 30 further comprises second holes 35 which enable the guide device (for example, the guide pin 15) to be guided through. A total of two second holes 35 are provided which are arranged along the diagonal direction of the substantially rectangular housing 31. The two first holes 33 and the two second holes 35 are arranged in each case diagonally at four corners of the housing 31 in order to save installation space and facilitate actuation.

In FIG. 11 and FIG. 12, the adapter 30 is also represented with a sealing groove 381. Just like the sealing groove 281 described in conjunction with FIG. 6, the sealing groove 381 is also used for putting in place a sealing ring, not shown here, in order to seal off the adapter 30 and the first connector 10 corresponding to the adapter 30 or another adapter 30. The concrete structure of the sealing groove 381 is similar to the structure of the sealing groove 281 shown in FIG. 6 for the second connector 20 and is therefore not described in greater detail.

FIG. 12 also represents a third hole 36, and the third hole 36 is used to place a locking element (such as e.g. a threaded bolt) in order to lock the first connector 10 and the adapter 30. The side wall of the adapter 30, to be more precise the side wall in the transverse direction, is provided with a clamping sleeve holder 37 which is substantially identical to the clamping sleeve holder of the first connector.

Figure 13:
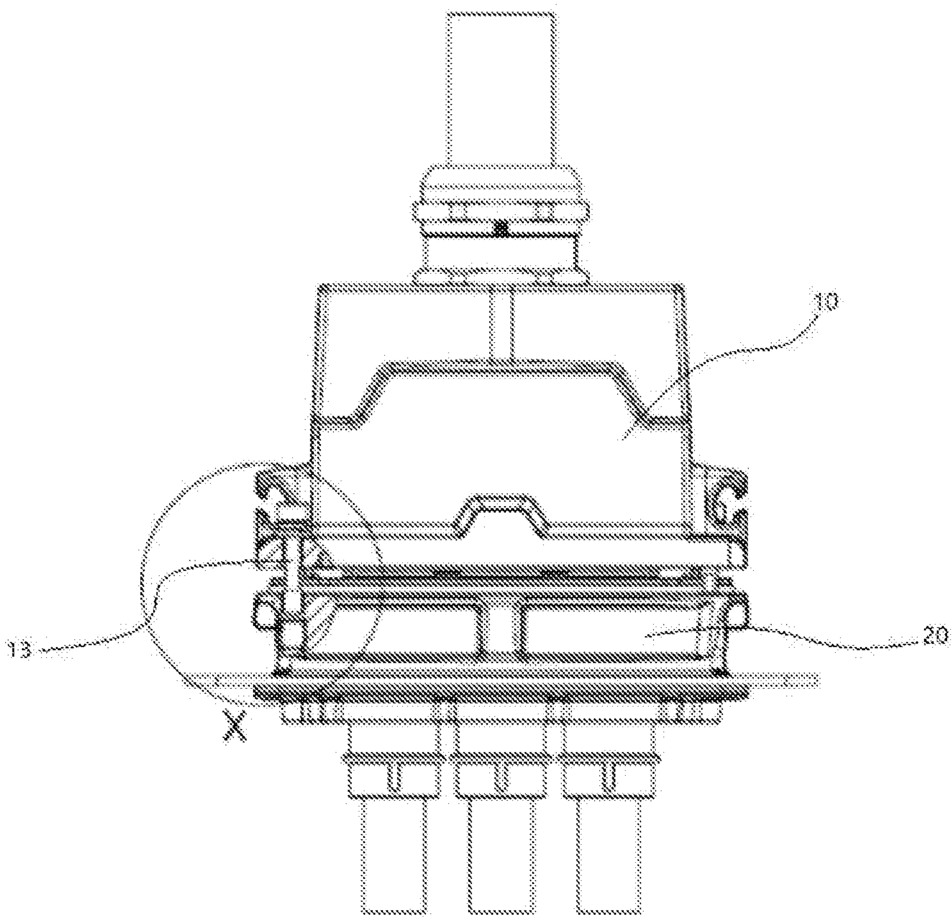
FIG. 13 is a representation of a use of the connector assembly, in the case of which no adapter is arranged between the first and second connector, wherein an example of a locking device between the first and second connector is represented in a partial sectional view.

FIG. 13 shows a representation of a use of the connector assembly 1, in the case of which no adapter 30 is arranged between the first connector 10 and the second connector 20, wherein one example of a locking device between the first connector 10 and the second connector 20 is represented in a partial sectional view; FIG. 14 shows an enlarged view of the portion X from FIG. 13.

As shown in FIG. 13, the connector assembly 1 comprises the first connector and the second connector 20 which are to be locked by means of the release protection bolt 13.

A detailed representation of the connection and locking between the first connector 10 and the second connector 20 is shown concretely in FIG. 14. In FIG. 14, the release protection bolt 13 is located in the first connector 10. The release protection bolt 13 has, at the points facing its two ends, a thread, i.e. a thread 132 at a point facing the distal end (i.e. the end facing the second connector 20), which is normally an M6 thread, and a thread 131 at a point facing the proximal end (i.e. the end facing the first connector which is likewise normally an M6 thread. The thread 132 serves the purpose of connection to the threaded insert 23 (also referred to as an insert) in the second connector through the thread in order to lock the first connector 10 and the second connector 20. The thread 131 serves the purpose of combination with the corresponding thread on the first connector 10 through threads in order to prevent the release of the release protection bolt 13 from the first connector 10 if the first connector 10 is not connected to the second connector 20. The outer diameter of the thread 132 is equal to or smaller than the outer diameter of the thread 131, and the diameter of a bolt portion located between the two threads of the release protection bolt 13 is smaller than the outer diameter of the two threads.

In the prior art, as a result of their complicated structures, the first connector 10 and the second connector 20 are generally produced from an aluminum alloy by pressure die-casting. In contrast, the bolt 13 of the connector is generally manufactured from steel, such as stainless steel. The bolt must therefore be removed several times during mounting so that the bolt can engage easily into the relatively soft material of the second connector and frictionless mounting work is thus enabled. In the case of the invention, a threaded insert 23 is provided in the second connector 20, which threaded insert 23 is produced from steel, such as stainless steel, in order to enable engagement of the bolt in the second connector and thus prevent an impairment of the mounting.

Moreover, FIG. 14 also represents the sealing ring 282, which is used for the purpose of putting in place in the sealing groove 281 shown in FIG. 9 of the second connector 20, and a guide hole 29 for the release protection bolt. The guide hole 29 for the release protection bolt has a diameter which is larger than the outer diameter of the thread 132 in order to guide the release protection bolt 13 into the second connector 20.

FIG. 14 furthermore also shows the clamping sleeve holder 17 in the first connector 10 which was described further above in conjunction with FIG. 4. A mating terminal 27 is provided on the second connector 20. One end of the clamping sleeve, not shown in the figure, is positioned in the mating terminal 27, and the other end of the clamping sleeve, not shown, is locked in the clamping sleeve holder 17 if the first connector 10 and the second connector 20 are supposed to be firmly locked. The clamping sleeve holder 17 has a locking plate 171 and a mating locking plate 172, between which an opening for admission of the clamping sleeve is formed.

Figure 15:
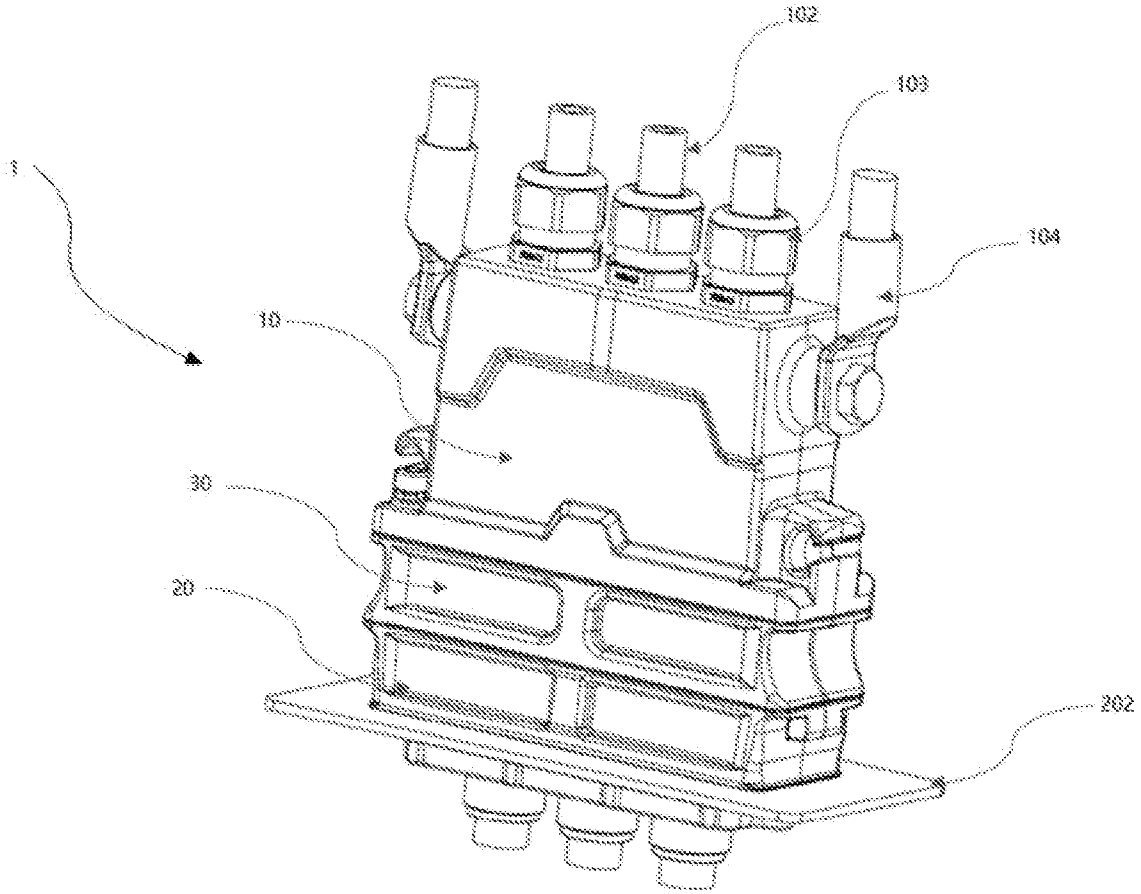
FIG. 15 is a perspective view of another use of the connector assembly, in the case of which an adapter is arranged between the first and second connector.

FIG. 15 shows a perspective view of another use of the connector assembly 1, in the case of which an adapter is arranged between the first and second connector; FIG. 16 shows a longitudinal section of the connector assembly 1 shown in FIG. 15.

The connector assembly 1 shown in FIG. 15 comprises the first connector 10, the second connector 20 and an adapter 30 located therebetween. A cable 102 is arranged on the housing of the first connector 10, and the cable 102 is linked by a cable gland 103 to the housing of the first connector 10. In each case a cable lug 104 to form an earth connection is provided on two sides of the housing of the first connector 10. The second connector 20 is mounted on a mounting panel 202 of the appliance and has at a lower end a high-current contact 203 shown in FIG. 16 for connection to a contact of the appliance. The mounting panel 202 is also referred to as a mounting frame or rear pressure frame. The mounting frame has an opening to accommodate the second connector 20.

FIG. 16 shows cable lugs 104 on both sides. The cable lug 104 fastens a screw 1051 on another threaded insert 1052 in the first connector 10 so that the earth connection 105 is locked to the first connector 10.

FIG. 16 also shows two coding pin halves 141, 241, of which the coding pin half 141 is located in the first connector 10 and penetrates through the adapter 30 and the coding pin half 241 is located in the second connector 20. The two coding pin halves 141, 241 lie parallel to one another and opposite to one another.

FIG. 16 furthermore shows three sealing rings 182, 282 and 382, of which the sealing ring 182 serves to seal off the first connector 10 with the adapter 30, the sealing ring 282 serves to seal off the adapter 30 with the second connector 20, and the sealing ring 382 serves to seal off the second connector 20 on the panel of the appliance.

The process of using and joining together the connector assembly 1 will now be described in conjunction with the enclosed figures, above all FIG. 14.

In the case of a highly resilient connector, several second connectors 20 which are equipped with contact terminals for corresponding cables are premounted on the appliance. Prior to mounting, it should be determined in accordance with the number of the coding hole in which the coding pin is located as to which second connector to which the first connector should be connected with the adapter or without the adapter to prevent incorrect joining together. Once the correct second connector is determined, the guide pin which penetrates through the first connector or the first connector and the adapter is inserted into the guide hole of the second connector in order to connect the first connector to the second connector. Once the first connector 10 or the first connector 10 and the adapter 30 is/are inserted into the second connector 20, the release protection bolt 13 is screwed so that it is connected to the threaded insert 23 in the second connector 20 and thus the first connector 10 and the second connector 20 are locked. Once the first and second connectors are locked, the sealing ring surrounds the fitting surfaces of the first and second connector in order to achieve the predefined electromagnetic shielding and imperviousness, such as e.g. the standard IP69 for water tightness. If the first connector 10 and the second connector 20 are supposed to be separated from one another, the release protection bolt 13 is screwed off from the threaded insert 23. Since in this case the thread 131 at the proximal point of the release protection bolt 13 is connected to the corresponding thread on the first connector, a release of the release protection bolt 13 from the first connector can be prevented.

FIG. 17 to FIG. 20 show a connector 10', therefore a first connector, in one embodiment. The connector 10' differs from the first connector 10 shown in FIG. 1 mainly in that a cable input 101' is arranged on the housing of the connector 10'. A cable is connected by a cable gland 103', in particular a cable gland of the type M50, via the cable input 101' to the housing. In comparison with the other cable gland, the cable gland of type M50 has a larger diameter. In order to achieve suitability for the use of the cable gland of type M50, two side walls are formed in an undulating manner in the longitudinal direction of the housing of the connector 10', as is clearly shown in particular in FIG. 19, so that the diameter of the threaded hole to receive the cable gland is enlarged.

FIG. 21 to FIG. 24 show a connector 10", therefore a first connector, in one embodiment. The connector 10" differs from the connector 10' shown in FIG. 17 mainly in that the connector 10" is embodied as an angled connector, i.e. one side in the transverse direction of the housing of the connector is formed as an oblique surface, which is referred to in this case as angled part 106".

Figure 25:
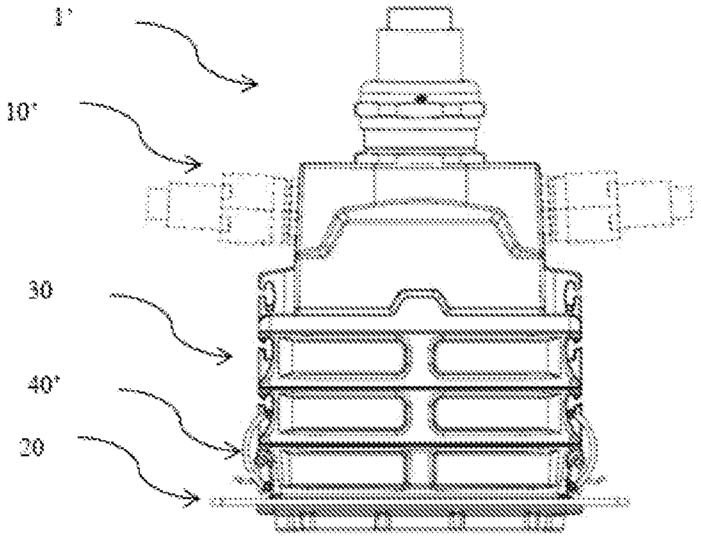
FIG. 25 is a representation of a connector assembly in one embodiment.
Figure 26:
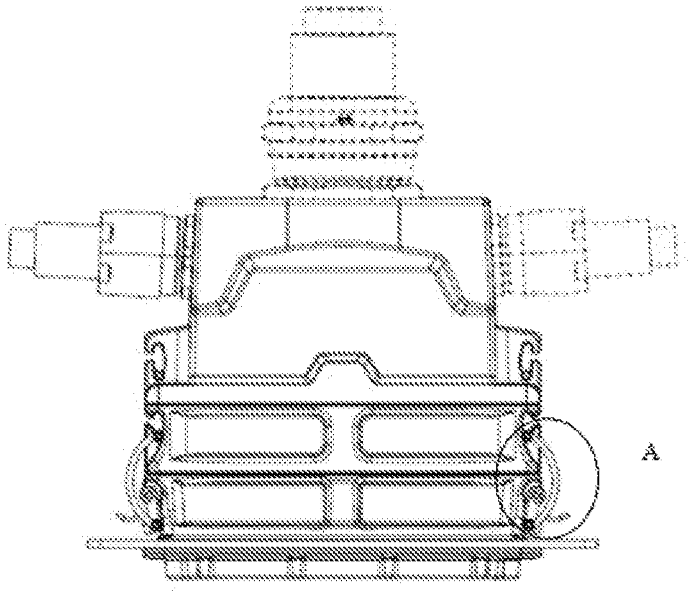
FIG. 26 is a representation of a variation of FIG. 25.

FIGS. 25 and 26 show a connector assembly 1' in one embodiment which comprises the connector 10' (the first connector) shown in FIGS. 17 to 20, the second connector 20 and one or two adapters 30. In each case one cable input 101' can be provided on the upper side and the two sides of the housing of the connector 10'. In fig. the cable extends through the upper cable input from the upper side into the housing. In FIG. 26, the cable extends through a lateral cable input from one side into the housing.

Figure 27:
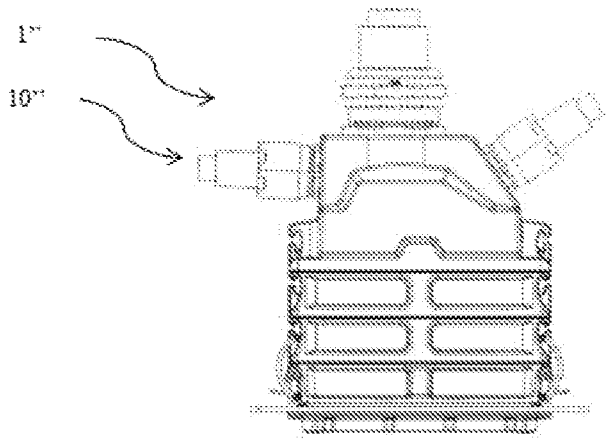
FIG. 27 is a representation of a connector assembly of one embodiment.
Figure 28:
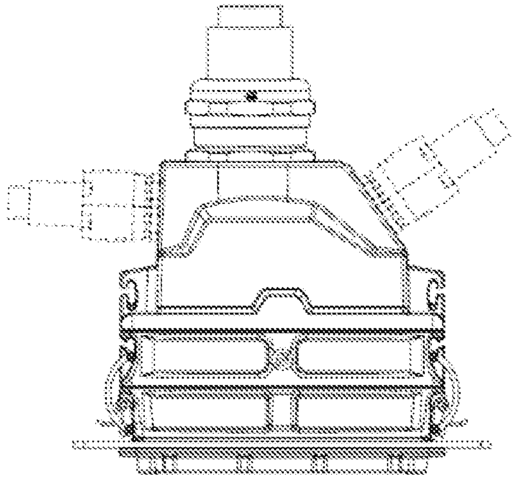
FIG. 28 is a representation of a variation of FIG. 27.
Figure 29:
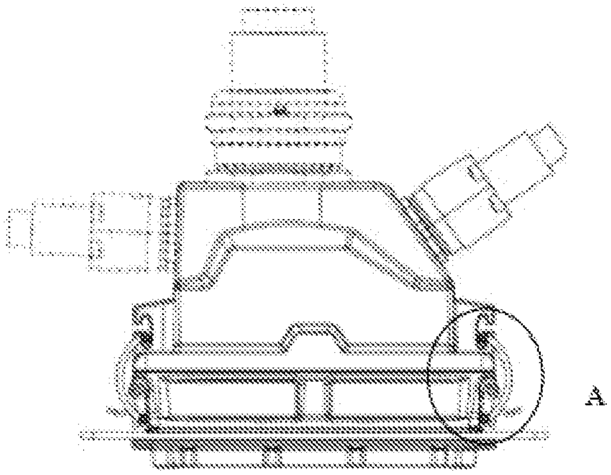
FIG. 29 is a representation of a variation of FIG. 27.

FIG. 27 to FIG. 29 show a connector 1" in one embodiment which comprises the angled connector shown in FIGS. 21 to 24. In each case a cable input 101' can be provided on the upper side and the two sides of the housing of the connector 10". The cable input on the side provided with the oblique surface is formed on the oblique surface and the cable input on the oblique surface is an angled cable input. In FIG. 27, the cable extends through the upper cable input from the upper side into the housing. In FIG. 28, the cable extends through a lateral cable input from the side into the housing. In FIG. 29, the cable extends through the angled cable input from the angled part 106' into the housing. In one exemplary embodiment, the angled cable input has an angle of 30° to a plane in the longitudinal direction of the housing, and in further exemplary embodiments it can be or any desired acute angle.

In the connector assemblies 1' and 1" shown in FIG. 25 to FIG. 29, the locking device is embodied as a lateral locking device 40' which is also referred to as a clamping sleeve. The locking is therefore performed in the case of this locking device on one or both sides in the transverse direction (namely the narrow side or narrow sides) of the connector assembly. If no adapter is present, the lateral locking device locks the first and second connector. If an adapter is present, the lateral locking device locks the adapter and the second connector.

The structure and mode of operation of the lateral locking device 40' are described below in conjunction with FIG. 30 to FIG. 38.

Figure 30:
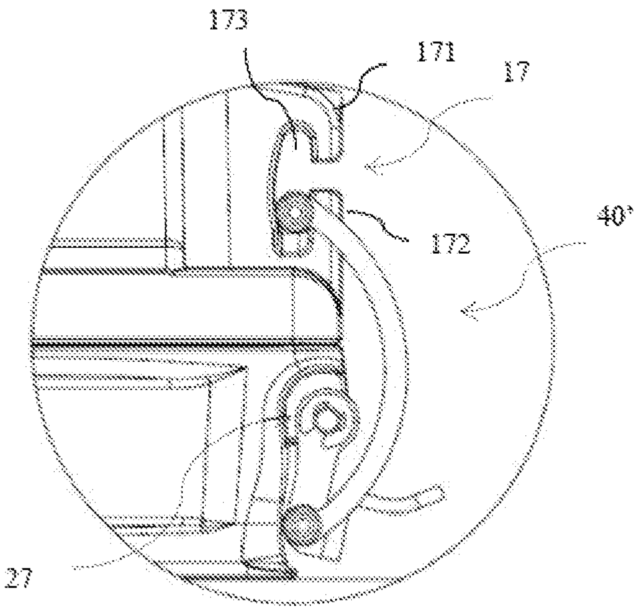
FIG. 30 is an enlarged view of the portion A in FIG. 29, in the case of which the lateral locking device is in a locked state.
Figure 38:
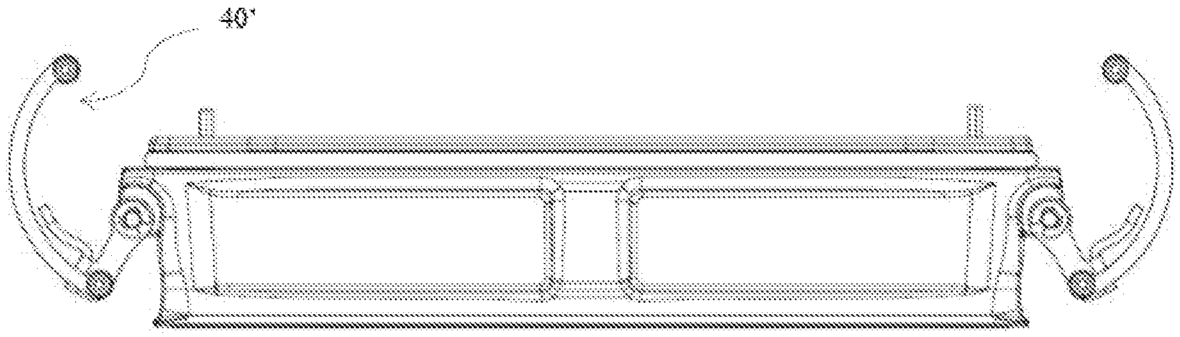
FIG. 38 is a representation of a connector equipped with the lateral locking device.
Figure 39:
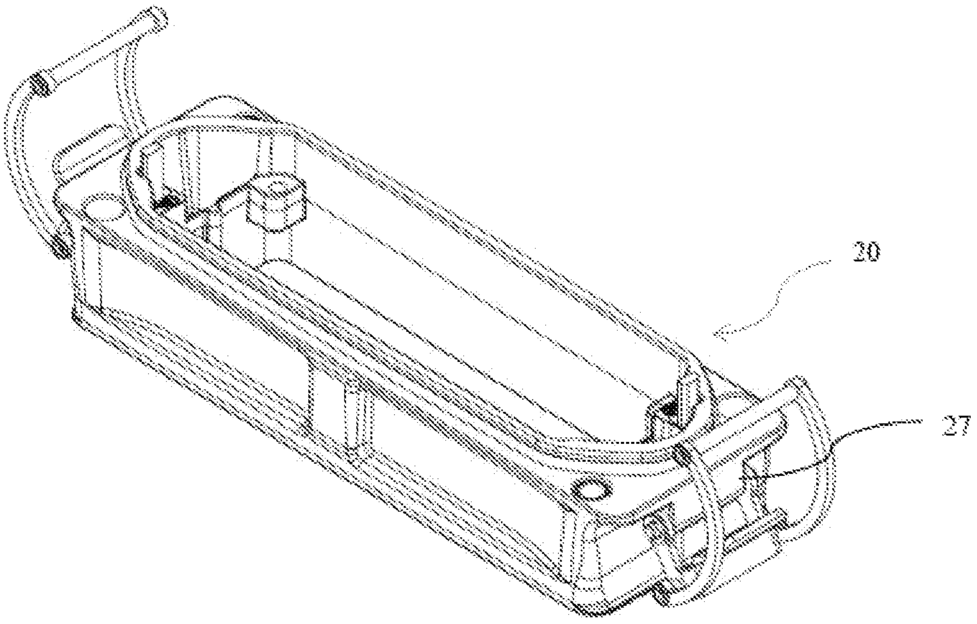
FIG. 39 is a representation of the connector from FIG. 38 from a different angle.
Figure 40:
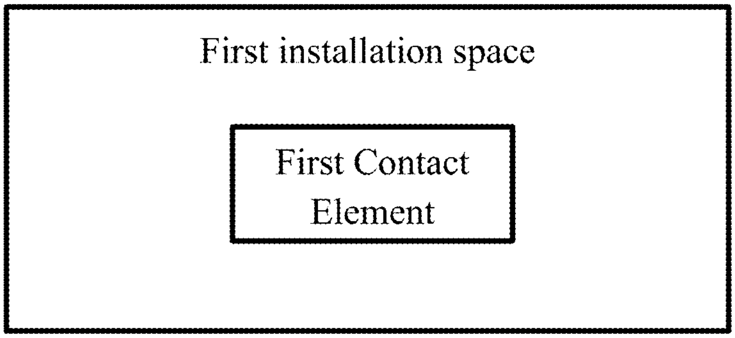
FIG. 40 schematically shows a first contact terminal accommodated in a first installation space.

FIG. 30 is an enlarged view of the portion A from FIG. 29. The lateral locking device 40' locks the first and second connector to one another. In particular, the lateral locking device 40' fits the locking holder 17 on the side wall of the first connector (the side wall in the transverse direction, i.e. the narrow side) and the mating terminal 27 on the side wall of the second connector (the side wall in the transverse direction, i.e. the narrow side) in order to lock the first and second connector. One end of the lateral locking device 40' is held pivotably on the mating terminal 27. FIGS. 38 and 39 clearly show a second connector 20 equipped with the lateral locking device 40'. A mating terminal 27 is integrally molded on an under side of a flange, provided with a guide pin hole, of the second connector 20. The mating terminal 27 is provided with a through-hole. The other end of the lateral locking device 40' engages into the locking holder 17. The lateral locking device 40' enters through an opening of the locking holder 17 between the locking plate 171 and the mating locking plate 172 into a receptacle 173 of the locking holder 17. The locking plate and the mating locking plate are formed to be hook-shaped and the opening is formed to be oblique in order to prevent the release of the connector in the unlocked state. In the locked state, the lateral locking device 40' is located on the bottom of the receptacle 173 and bears against the locking plate 171.

Figure 31:
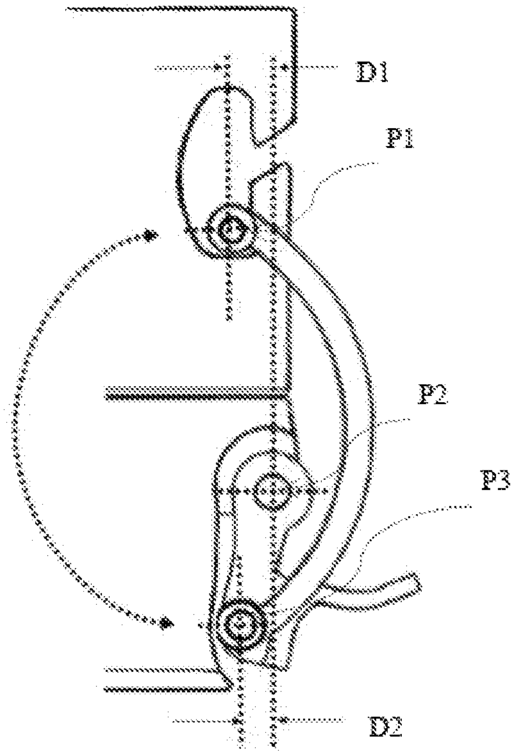
FIG. 31 is a simplified view of FIG. 30.

FIG. 31 shows the relationship between individual positioning points of the lateral locking device 40' in the locked state. The lateral locking device has three positioning points P1, P2 and P3. P1 is a positioning point of the lateral locking device on the bottom of the receptacle 173 of the locking holder 17, P2 is a positioning point of the lateral locking device on the mating terminal 27, which is also referred to as a first pivot point of the lateral locking device, and P3 is a positioning point of the lateral locking device on the mating terminal, which is also referred to as a second pivot point of the lateral locking device. In the locked state, the distance D1 between P1 and P2 is greater than the distance D2 between P2 and P3. In the longitudinal direction, P1 and P3 are located behind P2.

Figure 32:
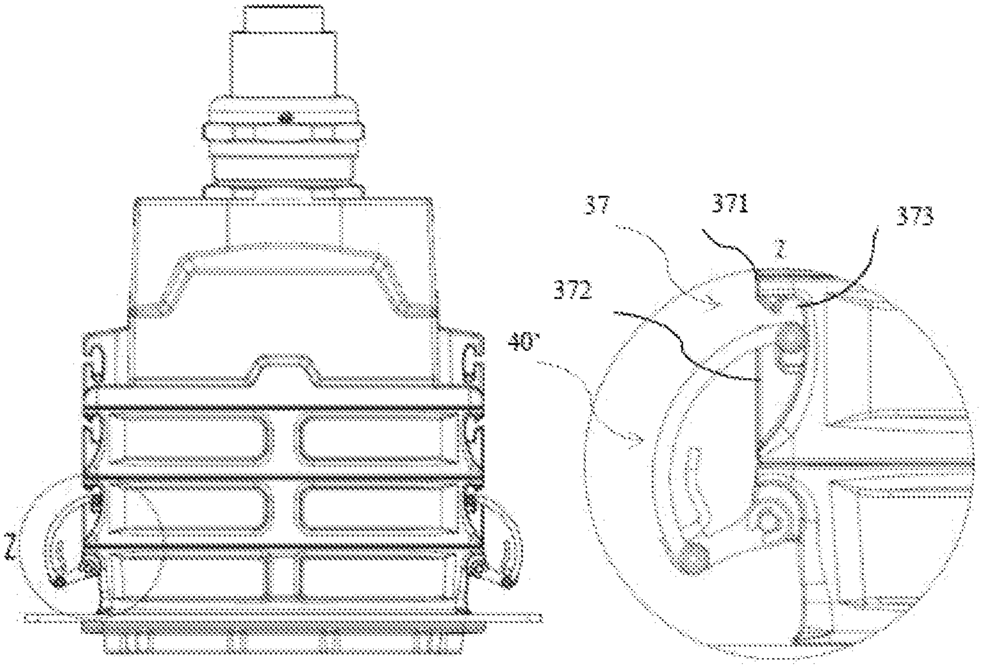
FIG. 32 is a representation as well as an enlarged view of a connector assembly in one embodiment, in the case of which the lateral locking device is in an unlocked state.
Figure 33:
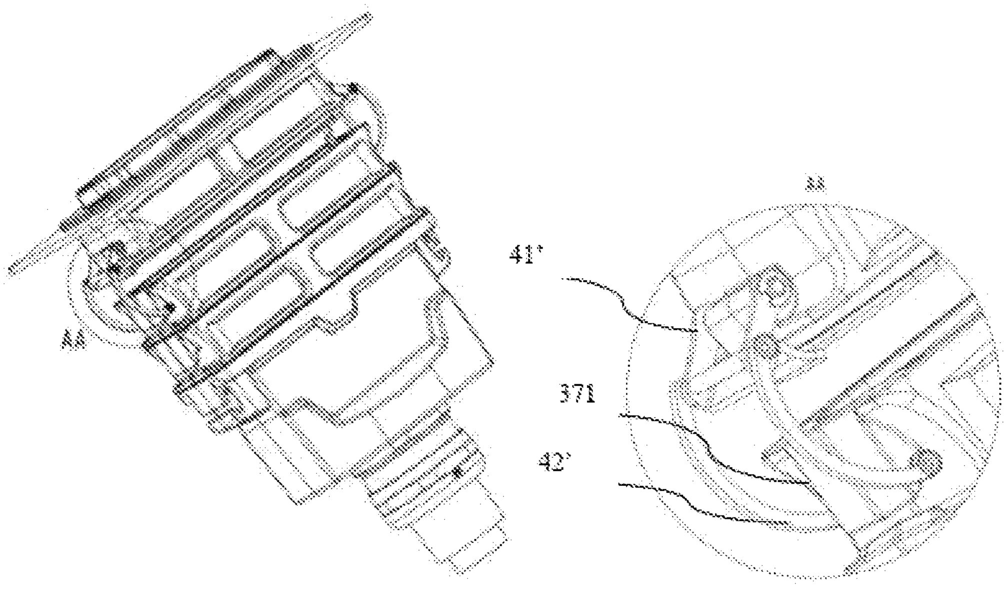
FIG. 33 is a reversed representation of a connector assembly in one embodiment and an enlarged view thereof.
Figure 34:
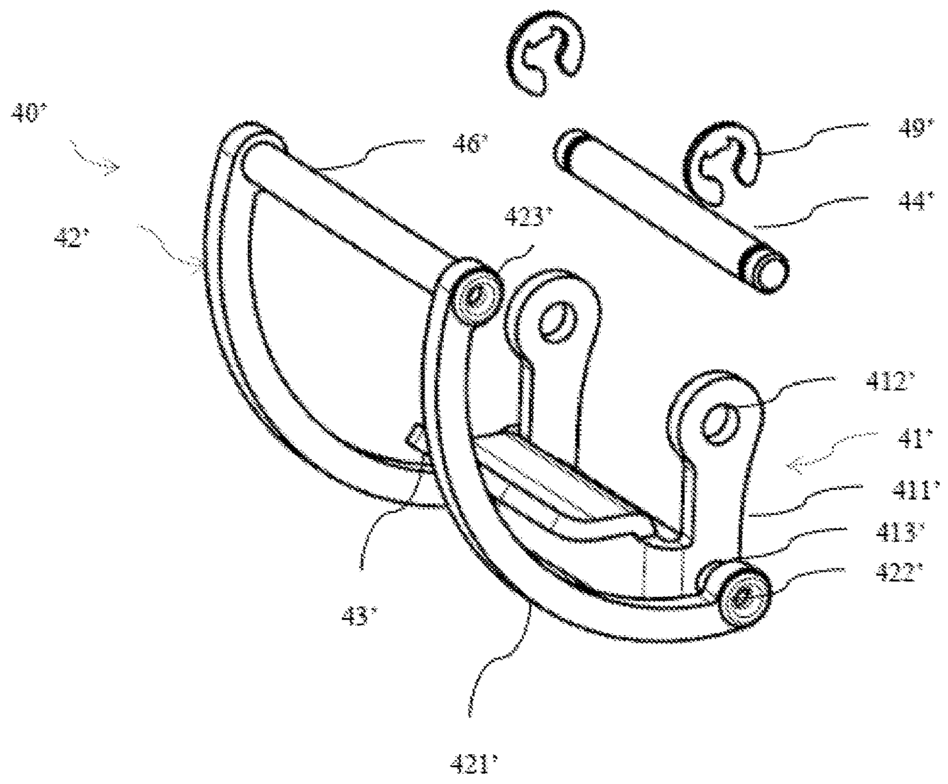
FIG. 34 is an exploded view of a lateral locking device in one embodiment.
Figure 35:
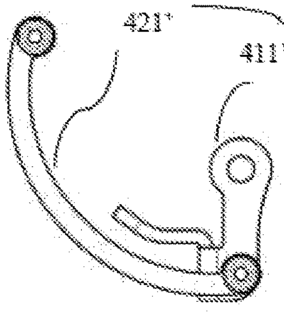
FIG. 35 is a side view of the lateral locking device from FIG. 34.
Figure 36:
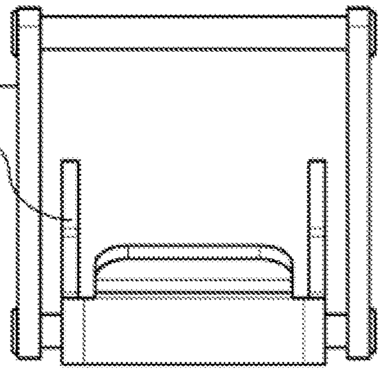
FIG. 36 is a rear view of the lateral locking device from FIG. 34.
Figure 37:
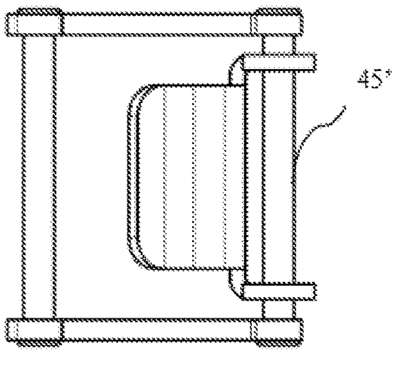
FIG. 37 is a plan view of the lateral locking device from FIG. 34.

FIGS. 32 and 33 show the connector assembly in an unlocked state. The connector assembly comprises the first connector, the adapter and the second connector. The lateral locking device fits the locking holder 37 on the side wall of the adapter and the mating terminal on the side wall of the second connector in order to lock the adapter and the second connector. In the unlocked state, the lateral pivot device 40' pivots about the side wall, facing away from the second connector, of the mating terminal 27 so that the lateral locking device is released from the locking holder 37. In particular, it is raised from the bottom of the receptacle 373 of the locking holder up to the opening. Here, a release of the connectors from one another in the case of an unlocked locking device can be prevented due to the oblique opening and the hook-shaped structure of the locking plate 371 and the mating locking plate 372.

FIGS. 34 to 37 show the concrete structure of the lateral locking device 40'. The lateral locking device 40' is configured as a structure with two levers, comprising a first lever 41', a second lever 42' and a handle 43'. The first lever 41' has two first lever arms 411' parallel to one another. A first pivot shaft hole 412' or a second pivot shaft hole 413' which enables a first pivot shaft 44' or a second pivot shaft 45' to be guided through is provided in each case at both ends of each of the first lever arms. The first lever 41' is mounted pivotably on the mating terminal 27 in that the first pivot shaft 44' is conducted through the through-hole of the mating terminal 27 of the second connector 20 and through the first pivot shaft hole 412' of the first lever 41' and is then locked at both ends with locking means 49' with an E-shaped outline. The first lever 41' further comprises a connecting portion 414' which connects the two first lever arms 411' to one another at the end at which the second pivot shaft hole 413' is located and is integrally molded with the first lever arms. A handle 43' is integrally molded on the connecting portion. The second lever 42' has two lever arms 421' which are parallel to one another and which are elastic and arc-shaped. In each case a third pivot shaft hole 422' or a fourth pivot shaft hole 423' which enables the second pivot shaft 45' or the third pivot shaft 46' to be guided through is provided at both ends of each of the second lever arms. The second lever 42' is mounted pivotably on the first lever 41' in that the second pivot shaft 45' is conducted through the second pivot shaft hole 413' of the first lever arm and through the third pivot shaft hole 422' of the second lever arm and is then riveted. The third pivot shaft 46' penetrates through the fourth pivot shaft hole 423' of the second lever arm. The second pivot shaft 46' fits the locking plates 171, 371 and is fixedly locked on the locking holders 17, 37.

The mode of operation of the lateral locking device 40' is as follows: If the lateral locking device is located in the locked state shown in FIG. 31 and is to be unlocked, a force must be exerted on the handle 43' so that the first lever 41' is pivoted about the first pivot axis 44', i.e. the point P2 in the figure, in an anti-clockwise direction. As a result of this, the point P3 (the second pivot shaft 45') is pivoted in an anti-clockwise direction into a position in front of P2 so that the second lever 42' is raised. This leads to raising of the third pivot shaft 46', i.e. at point P1, from the bottom of the receptacle 173 in order to transfer the lateral locking device into the unlocked state. If the lateral locking device is located in the unlocked state shown in FIG. 32 and is to be locked, a force must be exerted on the handle 43' so that the first lever 41' is pivoted about the first pivot shaft 44', i.e. the point P2, in an anti-clockwise direction. As a result of this, the second pivot shaft 45', i.e. the point P3, is pivoted in an anti-clockwise direction gradually into a position behind P2 so that the third pivot shaft 46', i.e. point P1, is lowered down to the bottom of the receptacle 373, bears against the locking plate 371 and is locked with it.

It should be clear to the person skilled in the art that the invention should naturally not be restricted to the exemplary embodiments described above. The invention can likewise be realized in other concrete forms without deviating from the essence and idea of the invention.

The invention claimed is:

1. A connector assembly (1), comprising:

a first connector (10), which has
- a first housing (11) that forms a first installation space (12), and
- a first contact terminal accommodated in the first installation space;

a second connector (20), which has
- a second housing (21) that forms a second installation space (22), and
- a second contact terminal accommodated in the second installation space;

a locking device (40) by which the first connector (10) can be locked to the second connector (20) when the first connector (10) and the second connector (20) are joined together; and an adapter (30), wherein the locking device (40) has
- a release protection component (13) located on the first connector and
- an insert (23) located on the second connector, wherein, when the first connector (10) and the second connector (20) are joined together, the release protection component (13) and the insert (23) engage in one another, and wherein, when the first connector (10) is separated from the second connector (20), the release protection component (13) is separated from the insert (23) and remains connected to the first connector, and wherein the adapter has
- an adapter housing (31) that forms an adapter installation space (32) and
- an adapter contact terminal accommodated in the adapter installation space, wherein the first installation space (12), the second installation space (22), and the adapter installation space (32) are connected to one another when the adapter is arranged between the first connector (10) and the second connector (20), and wherein the first contact terminal, the second contact terminal, and the adapter contact terminal can be connected to one another in order to transmit electrical energy.

2. The connector assembly (1) as claimed in claim 1, wherein the release protection component (13) is a release protection bolt, and wherein the insert (23) is a threaded insert, so that engaging in one another via a thread is possible both between the release
- protection bolt (13) and the threaded insert (23) and between the release
- protection bolt (13) and the first connector (10).

3. The connector assembly (1) as claimed in claim 1, further comprising
- a further release protection component (13),
- where the release protection component (13) and the further release protection component (13) are arranged along a diagonal direction of the first housing.

4. The connector assembly (1) as claimed in claim 1, further comprising
- a foolproof device (14, 24) which serves to prevent an incorrect joining together of the first connector and the second connector.

5. The connector assembly (1) as claimed in claim 4, wherein the foolproof device (14, 24) is a coding pin which comprises a first coding pin half (141) located on the first connector and a second coding pin half (241) located on the second connector, wherein the first coding pin half and the second coding pin half can be arranged opposite one another in a longitudinal direction of the coding pin if the first connector and the second connector are joined together.

6. The connector assembly (1) as claimed in claim 1, further comprising
- a sealing apparatus which serves to seal off fitting surfaces between the first connector and the second connector, wherein the sealing apparatus comprises
- a sealing groove (281, 381), which is located on one of the fitting surfaces which should be connected to one another, and
- a sealing ring (282, 382) inserted in the sealing groove, wherein a circumference of the sealing groove is larger than a circumference of the sealing ring in order to clamp the sealing ring when the sealing ring is inserted in the sealing groove.

7. The connector assembly (1) as claimed in claim 6, wherein the sealing groove (281, 381) has a polygonal outline and in a longitudinal direction of a corresponding fitting surface of a component, provided with the sealing groove, of the polygonal outline at least one indentation which projects outward.

8. The connector assembly (1) as claimed in claim 6, wherein the circumference of the sealing ring (282, 382) is 15% to 30% smaller than the circumference of the sealing groove.

9. The connector assembly (1) as claimed in claim 8, wherein the sealing ring (282, 382) has an expansion and contraction rate of 15% to 30%.

10. The connector assembly (1) as claimed in claim 1, wherein the first housing (11) or the second housing (21) has a cable input (101') via which a cable (102) is linked by a cable gland (103, 103') to the housing, wherein two side walls are formed in each case in an undulating manner in a longitudinal direction of the housing of the connector.

11. The connector assembly (1) as claimed in claim 10, wherein the cable gland (103, 103') is an M50 cable gland.

12. The connector assembly (1) as claimed in claim 11, wherein the cable input (101') comprises an upper cable input and a lateral cable input.

13. The connector assembly (1) as claimed in claim 11, wherein the first connector (10) or the second connector (20) is an angled connector, wherein the cable input (101') comprises an upper cable input, a lateral cable input and an angled cable input.

14. The connector assembly (1) as claimed in claim 13, wherein the angled cable input has an angle of 30° or 45° to a plane in a longitudinal direction of the housing.

15. A connector assembly (1), comprising:

a first connector (10), which has
- a first housing (11) that forms a first installation space (12), and
- a first contact terminal accommodated in the first installation space;

a second connector (20), which has
- a second housing (21) that forms a second installation space (22), and
- a second contact terminal accommodated in the second installation space; and a locking device (40) by which the first connector (10) can be locked to the second connector (20) when the first connector (10) and the second connector (20) are joined together, wherein the locking device (40) has
- a release protection component (13) located on the first connector and
- an insert (23) located on the second connector, wherein, when the first connector (10) and the second connector (20) are joined together, the release protection component (13) and the insert (23) engage in one another, and wherein, when the first connector (10) is separated from the second connector (20), the release protection component (13) is separated from the insert (23) and remains connected to the first connector, wherein the release protection component (13) is a release protection bolt, and wherein the insert (23) is a threaded insert, so that engaging in one another via a thread is possible both between the release protection bolt (13) and the threaded insert (23) and between the release protection bolt (13) and the first connector (10), wherein the release protection bolt (13) has at points facing its two ends in each case a thread (131, 132), wherein, when the first connector (10) and the second connector (20) are joined together, the thread (132) of a point facing a distal end of the release protection bolt serves to engage the threaded insert, whereas, when the first connector (10) is separated from the second connector (20), the thread (131) of a point facing a proximal end of the release protection bolt serves to combine with a thread in the first housing, wherein an outer diameter of the thread (132) of the point facing the distal end of the release protection bolt is equal to or smaller than the outer diameter of the thread (131) of the point facing the proximal end of the release protection bolt and a diameter of a bolt portion, located between these two threads, of the release protection bolt is smaller than the outer diameter of the two threads.

16. A connector assembly (1), comprising:

a first connector (10), which has
- a first housing (11) that forms a first installation space (12), and
- a first contact terminal accommodated in the first installation space;

a second connector (20), which has
- a second housing (21) that forms a second installation space (22), and
- a second contact terminal accommodated in the second installation space;

a locking device (40) by which the first connector (10) can be locked to the second connector (20) when the first connector (10) and the second connector (20) are joined together; and a guide device (15) which serves during mounting of the first connector and the second connector to guide fitting of the first connector and the second connector to one another, which guide device (15) comprises a first guide element located on the first connector and a second guide element located on the second connector, wherein the locking device (40) has
- a release protection component (13) located on the first connector and
- an insert (23) located on the second connector, wherein, when the first connector (10) and the second connector (20) are joined together, the release protection component (13) and the insert (23) engage in one another, wherein, when the first connector (10) is separated from the second connector (20), the release protection component (13) is separated from the insert (23) and remains connected to the first connector, and wherein the connector assembly has two guide devices which are arranged along a diagonal direction of the first housing or the second housing and opposite the release protection component arranged on the first connector.

17. A connector assembly (1), comprising:

a first connector (10), which has
- a first housing (11) that forms a first installation space (12), and
- a first contact terminal accommodated in the first installation space;

a second connector (20), which has
- a second housing (21) that forms a second installation space (22), and
- a second contact terminal accommodated in the second installation space;

a locking device (40) by which the first connector (10) can be locked to the second connector (20) when the first connector (10) and the second connector (20) are joined together; and an adapter (30),
wherein the locking device (40) has
a release protection component (13) located on the first connector and
an insert (23) located on the second connector,
wherein, when the first connector (10) and the second connector (20) are joined together, the release protection component (13) and the insert (23) engage in one another,
wherein, when the first connector (10) is separated from the second connector (20), the release protection component (13) is separated from the insert (23) and remains connected to the first connector,
wherein the adapter (30) has an adapter housing (31) that forms an adapter installation space (32) and an adapter contact terminal (301) accommodated in the adapter installation space, and
wherein the first connector and the second connector are identical.

18. The connector assembly (1) as claimed in claim 17, wherein the adapter (30) furthermore comprises
a first hole (33) which enables the release protection component (13) of the locking device to be guided through and
a second hole (35) which enables a guide device (15) which serves to guide fitting of the first connector and the second connector to one another to be guided through.

19. The connector assembly (1) as claimed in claim 17, wherein the adapter (30) comprises two first holes (33) and two second holes (35),
wherein the two first holes and the two second holes are arranged in each case diagonally at four corners of the adapter housing.

20. The connector assembly (1) as claimed in claim 19, wherein the adapter (30) furthermore comprises a third hole (36) to accommodate a locking element,
wherein the locking element serves to lock the first connector and the adapter.

21. The connector assembly (1) as claimed in claim 17, wherein the adapter furthermore comprises a sealing groove (381) to accommodate a sealing ring (382),
wherein the sealing groove has a polygonal outline and in a longitudinal direction of a fitting surface of the adapter, provided with the sealing groove, the polygonal outline has at least one indentation which projects outward.

22. The connector assembly (1) as claimed in claim 21, wherein a circumference of the sealing ring (382) is 15% to 30% smaller than a circumference of the sealing groove.

23. The connector assembly (1) as claimed in claim 22, wherein the sealing ring (382) has an expansion and contraction rate of 15% to 30%.

24. A connector assembly (1), comprising:
a first connector (10), which has
a first housing (11) that forms a first installation space (12), and
a first contact terminal accommodated in the first installation space;
a second connector (20), which has
a second housing (21) that forms a second installation space (22), and
a second contact terminal accommodated in the second installation space; and
a locking device (40) by which the first connector (10) can be locked to the second connector (20) when the first connector (10) and the second connector (20) are joined together,
wherein the locking device (40) has
a release protection component (13) located on the first connector and
an insert (23) located on the second connector,
wherein, when the first connector (10) and the second connector (20) are joined together, the release protection component (13) and the insert (23) engage in one another, and
wherein, when the first connector (10) is separated from the second connector (20), the release protection component (13) is separated from the insert (23) and remains connected to the first connector,
wherein the locking device (40) is a lateral locking device (40'),
wherein the lateral locking device (40') fits with a locking holder (17) on a side wall of the first connector and with a mating terminal (27) on a side wall of the second connector in order to lock the first connector and the second connector, and
wherein the lateral locking device (40') is a structure with two levers.

25. The connector assembly (1) as claimed in claim 24, wherein, the connector assembly (1', 1") further comprises an adapter (30),
wherein the first connector, the second connector, and the adapter are joined together,
wherein the second connector and the adapter are locked by the lateral locking device (40'), and
wherein the adapter (30) has a clamping sleeve holder (37).

26. The connector assembly (1) as claimed in claim 24, further comprising a mounting frame (202) which fastens the connector assembly to an appliance,
wherein the mounting frame has an opening to accommodate the second connector and a sealing means to provide a seal between the second connector and the mounting frame.

27. The connector assembly (1) as claimed in claim 24, wherein the lateral locking device (40') comprises
a first lever (41'), which is mounted pivotably on the mating terminal (27) of the second connector, and
a second lever (42'), which is mounted pivotably on the first lever and serves for fixed locking on the locking holder (17) of the first connector.

28. The connector assembly (1) as claimed in claim 27, wherein the second lever (42') is elastic.

29. The connector assembly (1) as claimed in claim 28, wherein the first lever (41') has a handle (43').

30. The connector assembly (1) as claimed in claim 29, wherein the first lever (41') comprises two first lever arms (411') parallel to one another, wherein each of the two first lever arms comprises at both ends a first pivot shaft hole (412'), which enables a first pivot shaft (44') to be guided through, or a second pivot shaft hole (413'), which enables a second pivot shaft (45') to be guided through, as well as a connecting portion (414') which connects the two first lever arms to one another at the end at which the second pivot shaft hole is located; wherein the handle (43') is molded integrally on the connecting portion;
wherein the second lever (42') comprises two second lever arms (421') parallel to one another, wherein each of the two second lever arms comprises at both ends in each case a third pivot shaft hole (422'), which enables the second pivot shaft (45') to be guided through, and a fourth pivot shaft hole (423'), which enables a third pivot shaft (46') to be guided through; and wherein the second lever is arc-shaped.

31. The connector assembly (1) as claimed in claim 30, wherein the locking holder (17) is a clamping sleeve holder (17), wherein the mating terminal (27) of the second connector has a through-hole, wherein the first pivot shaft (44') penetrates through the through-hole and the first pivot shaft hole (412') and is fastened by means of an E-shaped locking means (49') to the mating terminal, wherein the clamping sleeve holder (17) comprises a locking plate (171) and a mating locking plate (172), between which an opening for admitting and discharging the third pivot shaft (46') of the second connector (42') is formed, and wherein the opening is oblique.

* * * * *